US009948833B2

(12) United States Patent
Kim et al.

(10) Patent No.: US 9,948,833 B2
(45) Date of Patent: Apr. 17, 2018

(54) APPARATUS AND METHOD FOR SYNCHRONIZING DATA OF ELECTRONIC DEVICE

(71) Applicant: Samsung Electronics Co., Ltd., Gyeonggi-do (KR)

(72) Inventors: Dongsoo Kim, Gyeonggi-do (KR); Hwayong Kang, Gyeonggi-do (KR); Youngkwon Yoon, Seoul (KR); Moonsoo Kim, Seoul (KR); Jaemyung Baek, Gyeonggi-do (KR); Jonghoon Won, Gyeonggi-do (KR); Taekseong Jeong, Gyeonggi-do (KR)

(73) Assignee: Samsung Eletronics Co., Ltd. (KR)

( * ) Notice: Subject to any disclaimer, the term of this patent is extended or adjusted under 35 U.S.C. 154(b) by 0 days.

(21) Appl. No.: 15/389,794

(22) Filed: Dec. 23, 2016

(65) Prior Publication Data

US 2017/0187928 A1 Jun. 29, 2017

(30) Foreign Application Priority Data

Dec. 24, 2015 (KR) ........................ 10-2015-0186616

(51) Int. Cl.
*H04N 5/335* (2011.01)
*H04N 5/04* (2006.01)
*H04N 9/44* (2006.01)

(52) U.S. Cl.
CPC ................. *H04N 5/04* (2013.01); *H04N 9/44* (2013.01)

(58) Field of Classification Search
CPC ........................................................ H04N 5/04
See application file for complete search history.

(56) References Cited

U.S. PATENT DOCUMENTS

| 7,333,725 | B1 | 2/2008 | Frazler |
| 8,717,422 | B2 | 5/2014 | Hewes et al. |
| 9,389,409 | B2 | 7/2016 | Xia |

(Continued)

FOREIGN PATENT DOCUMENTS

| WO | WO 2012/171440 | 12/2012 |
| WO | WO 2015/000440 | 1/2015 |

OTHER PUBLICATIONS

International Search Report dated Mar. 10, 2017 issued in counterpart application No. PCT/KR2016/014862, 7 pages.

*Primary Examiner* — Gary C Vieaux
(74) *Attorney, Agent, or Firm* — The Farrell Law Firm, P.C.

(57) ABSTRACT

Methods and apparatuses are provided for synchronizing data by an electronic device. A first operation characteristic of a first image sensor of the electronic device and a second operation characteristic of a second image sensor of the electronic device are identified. At least one of a first access period of a first row of the first image sensor and a second access period of a second row of the second image sensor is changed, based on a difference between the first operation characteristic and the second operation characteristic, to synchronize the first access period and the second access period. The second row corresponds to the first row. Image data corresponding to the first row is acquired through the first image sensor based on the synchronized first access period. Image data corresponding to the second row is acquired through the second image sensor based on the synchronized second access period.

20 Claims, 34 Drawing Sheets

(56) References Cited

U.S. PATENT DOCUMENTS

| | | |
|---|---|---|
| 2011/0063483 A1 | 3/2011 | Rossi et al. |
| 2011/0267269 A1 | 11/2011 | Tardif et al. |
| 2011/0267427 A1 | 11/2011 | Goh et al. |
| 2012/0188392 A1 | 7/2012 | Smith |
| 2014/0132714 A1 | 5/2014 | Goh et al. |
| 2015/0172570 A1 | 6/2015 | Goto et al. |
| 2015/0195469 A1 | 7/2015 | Kim |
| 2017/0187981 A1* | 6/2017 | Park .................. H04N 5/2258 |

* cited by examiner

|     | $C_1$ | $C_2$ | $C_3$ | $C_4$ | $C_5$ | $C_6$ | $C_7$ | $C_8$ |
|-----|-------|-------|-------|-------|-------|-------|-------|-------|
| r1  | $B_1$ | $G_2$ | $B_3$ | $G_4$ | B | G | B | G |
| r2  | $G_5$ | $R_6$ | $G_7$ | $R_8$ | G | R | G | R |
| r3  | $B_9$ | $G_{10}$ | $B_{11}$ | $G_{12}$ | B | G | B | G |
| r4  | $G_{13}$ | $R_{14}$ | $G_{15}$ | $R_{16}$ | G | R | G | R |
| r5  | B | G | B | G | B | G | B | G |
| r6  | G | R | G | R | G | R | G | R |
| r7  | B | G | B | G | B | G | B | G |
| r8  | G | R | G | R | G | R | G | R |

FIG. 17A

APPARATUS AND METHOD FOR SYNCHRONIZING DATA OF ELECTRONIC DEVICE

PRIORITY

This application claims priority under 35 U.S.C. § 119(a) to Korean Application Serial No. 10-2015-0186616, which was filed in the Korean Intellectual Property Office on Dec. 24, 2015, the content of which is incorporated herein by reference.

BACKGROUND

1. Field of the Disclosure

The present disclosure relates generally a method for synchronizing data of an electronic device, and more particularly, to an electronic device capable of synchronizing and accessing data of an image sensor in a device having a plurality of image sensors, and an operation method thereof.

2. Description of the Related Art

Various types of electronic devices, such as, for example, mobile communication terminals, smart phones, tablet personal computers (PCs), personal digital assistants (PDAs), electronic notes, notebooks, and wearable devices, are widely used. The electronic devices have reached a level of mobile convergence at which they may include functions of other devices.

An electronic device may include a plurality of image sensors, and may acquire images by simultaneously driving the plurality of image sensors. The plurality of image sensors included in an electronic device may have different operation speeds, and thus, the electronic device may not acquire the same frame and/or line image data in the same access period.

SUMMARY

The present disclosure has been made to address at least the above problems and/or disadvantages and to provide at least the advantages described below. Accordingly, an aspect of the present disclosure provides an apparatus and a method for synchronizing data acquired from a plurality of image sensors by an electronic device including the image sensors.

Another aspect of the present disclosure provides an apparatus and a method for acquiring frame and line images by synchronizing operations speeds of image sensors by an electronic device.

According to an aspect of the present disclosure, an electronic device is provided that includes a first image sensor, a second image sensor, and a processor functionally connected to the first image sensor and the second image sensor. The processor is configured to identify a first operation characteristic of the first image sensor and a second operation characteristic of the second image sensor. The processor is also configured to change at least one of a first access period of a first row of the first image sensor and a second access period of a second row of the second image sensor, based on a difference between the first operation characteristic and the second operation characteristic, to synchronize the first access period and the second access period. The second row corresponds to the first row. The processor is further configured to acquire image data corresponding to the first row through the first image sensor based on the synchronized first access period, and acquire image data corresponding to the second row through the second image sensor based on the synchronized second access period.

According to another embodiment of the present disclosure, a method is provided for synchronizing data by an electronic device. A first operation characteristic of a first image sensor of the electronic device and a second operation characteristic of a second image sensor of the electronic device are identified. At least one of a first access period of a first row of the first image sensor and a second access period of a second row of the second image sensor is changed, based on a difference between the first operation characteristic and the second operation characteristic, to synchronize the first access period and the second access period. The second row corresponds to the first row. Image data corresponding to the first row is acquired through the first image sensor based on the synchronized first access period. Image data corresponding to the second row is acquired through the second image sensor based on the synchronized second access period.

According to another embodiment of the present disclosure, a method is provided for synchronizing data by an electronic device. It is determined that a first operation characteristic of a first image sensor of the electronic device and a second operation characteristic of a second image sensor of the electronic device are different. Synchronization with respect to row access periods of the first and second image sensors is performed based on a type of the first and second operation characteristics. First image data is acquired through the first image sensor and second image data is acquired through the second image sensor. The first image data and the second image data are processed.

BRIEF DESCRIPTION OF THE DRAWINGS

The above and other aspects, features, and advantages of the present disclosure will be more apparent from the following detailed description when taken in conjunction with the accompanying drawings, in which:

FIGS. 17A to 17C are diagrams illustrating an operation of an image sensor that executes a binning mode, according to an embodiment of the present disclosure.

DETAILED DESCRIPTION

Figure 1:
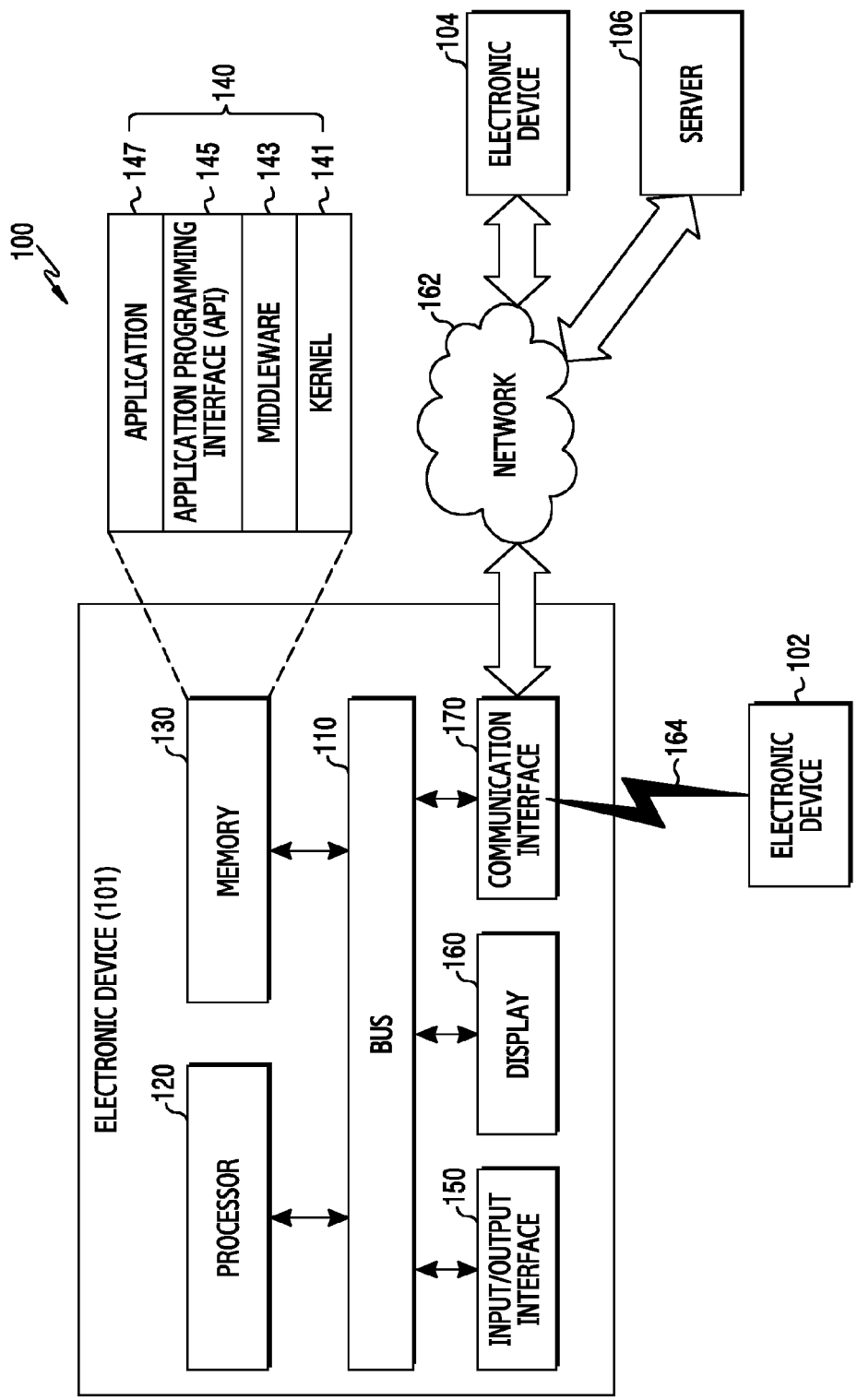
FIG. 1 is a diagram illustrating a network environment including an electronic device, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms used herein are defined in consideration of functions of the present disclosure and may vary depending on a user's or an operator's intention and usage. Therefore, the terms used herein should be understood based on the descriptions made herein. It is to be understood that the singular forms "a," "an," and "the" include plural referents unless the context clearly dictates otherwise. In the present disclosure, an expression such as "A or B," "at least one of A and B," or "one or more of A and B" may include all possible combinations of the listed items. Expressions such as "first," "second," "primarily," or "secondary," as used herein, may represent various elements regardless of order and/or importance, and do not limit corresponding elements. The expressions may be used for distinguishing one element from another element. When it is described that an element (such as a first element) is operatively or communicatively "coupled to" or "connected to" another element (such as a second element), the element can be directly connected to the other element or can be connected through another element (such as a third element).

The expression "configured to (or set)", as used in the present disclosure, may be used interchangeably with, for example, "suitable for," "having the capacity to," "designed to," "adapted to," "made to," or "capable of" according to the situation. The term "configured to (or set)" does not only mean "specifically designed to" by hardware. Alternatively, in some situations, the expression "apparatus configured to" may mean that the apparatus "can" operate together with another apparatus or component. For example, the phrase "a processor configured (or set) to perform A, B, and C" may be a generic-purpose processor (such as a central processing (CPU) or an application processor (AP)) that can perform a corresponding operation by executing at least one software program stored at an exclusive processor (such as an embedded processor) for performing a corresponding operation or at a memory device.

An electronic device, according to embodiments of the present disclosure, may be embodied as, for example, at least one of a smart phone, a tablet PC, a mobile phone, a video phone, an e-book reader, a desktop PC, a laptop PC, a netbook computer, a workstation, a server, a PDA, a portable multimedia player (PMP), an MPEG 3 (MP3) player, medical equipment, a camera, and a wearable device. The wearable device can include at least one of an accessory type (e.g., a watch, a ring, a bracelet, an ankle bracelet, a necklace, glasses, a contact lens, or a head-mounted-device (HMD)), a fabric or clothing embedded type (e.g., electronic garments), a body attachable type (e.g., a skin pad or a tattoo), and an implantable circuit. The electronic device may be embodied as at least one of, for example, a television, a digital versatile disc (DVD) player, an audio device, a refrigerator, an air-conditioner, a cleaner, an oven, a microwave oven, a washing machine, an air cleaner, a set-top box, a home automation control panel, a security control panel, a media box, an electronic dictionary, an electronic key, a camcorder, and an electronic frame.

In another embodiment, the electronic device may be embodied as at least one of various medical devices (such as, various portable medical measuring devices (a blood sugar measuring device, a heartbeat measuring device, a blood pressure measuring device, or a body temperature measuring device), a magnetic resonance angiography (MRA) device, a magnetic resonance imaging (MRI) device, a computed tomography (CT) device, a scanning machine, and an ultrasonic wave device), a navigation device, a global navigation satellite system (GNSS), an event data recorder (EDR), a flight data recorder (FDR), a vehicle infotainment device, electronic equipment for ship (such as, a navigation device for ship and gyro compass), avionics, a security device, a head unit for a vehicle, an industrial or home robot, a drone, an automated teller machine (ATM) of a financial institution, a point of sales (POS) device of a store, and an Internet of things (IoT) device (e.g., a light bulb, various sensors, a sprinkler device, a fire alarm, a thermostat, a street light, a toaster, sports equipment, a hot water tank, a heater, and a boiler).

According to an embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device). An electronic device, according to an embodiment, can be a flexible electronic device or a combination of two or more of the foregoing various devices. An electronic device is not limited to the foregoing devices may be embodied as a newly developed electronic device. The term "user", as used herein, can refer to a person using an electronic device or a device using an electronic device (e.g., an artificial intelligence electronic device).

Referring initially to FIG. 1, a diagram illustrates a network environment including an electronic device, according to an embodiment of the present disclosure. An electronic device 101 resides in a network environment 100. The electronic device 101 includes a bus 110, a processor 120, a memory 130, an input/output interface 150, a display 160, and a communication interface 170. The electronic device 101 may be provided without at least one of the components, or may include at least one additional component. The bus 110 can include a circuit for connecting the components 120 through 170 and delivering communication signals (e.g., control messages or data) therebetween. The processor 120 can include one or more of a CPU, an AP, and a communication processor (CP). The processor 120, for example, can perform an operation or data processing with respect to control and/or communication of at least another component of the electronic device 101.

The memory 130 can include a volatile and/or nonvolatile memory. The memory 130, for example, can store commands or data relating to at least another component of the electronic device 101. According to an embodiment, the memory 130 can store software and/or a program 140. The program 140 can include, for example, a kernel 141, middleware 143, an application programming interface (API) 145, and/or an application program (or "application") 147. At least part of the kernel 141, the middleware 143, or the API 145 can be referred to as an operating system (OS). The kernel 141 can control or manage system resources (e.g., the bus 110, the processor 120, or the memory 130) used for performing operations or functions implemented by the other programs (e.g., the middleware 143, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve an intermediary role for exchanging data between the API 145 or the application program 147 and the kernel 141 through communication. Additionally, the middleware 143 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control. The input/output interface 150, for example, can deliver commands or data inputted from a user or another external device to other component(s) of the electronic device 101, or output commands or data inputted from the other component(s) of the electronic device 101 to the user or another external device.

The display 160, for example, can include a liquid crystal display (LCD), a light emitting diode (LED) display, an organic light emitting diode (OLED) display, a microelectromechanical systems (MEMS) display, or an electronic paper display. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part. The communication interface 170, for example, can set a communication between the electronic device 101 and an external device (e.g., a first external electronic device 102, a second external electronic device 104, or a server 106). For example, the communication interface 170 can communicate with the external device (e.g., the second external electronic device 104 or the server 106) over a network 162 through wireless communication or wired communication.

The wireless communication, for example, can include cellular communication using at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communication can include, for example, at least one of wireless fidelity (WiFi), bluetooth, bluetooth low energy (BLE), Zigbee, near field communication (NFC), magnetic secure transmission, radio frequency (RF), and body area network (BAN). The wireless communication can include GNSS. The GNSS can include, for example, global position system (GPS), global navigation satellite system (GLONASS), Beidou navigation satellite system (Beidou), or Galileo (the European global satellite-based navigation system). Hereafter, the GPS can be interchangeably used with the GNSS. The wired communication, for example, can include at least one of universal serial bus (USB), high definition multimedia interface (HDMI), Recommended Standard 232 (RS-232), power line communications, and plain old telephone service (POTS). The network 162 can include a telecommunications network, for example, at least one of computer network (e.g., local area network (LAN) or wide area network (WAN)), Internet, and telephone network.

Each of the first and second external electronic devices 102 and 104 can be of the same as or of a different type from that of the electronic device 101. According to embodiments of the present disclosure, all or part of operations executed in the electronic device 101 can be executed by another electronic device or a plurality of electronic devices (e.g., the external electronic device 102 or 104, or the server 106). To perform a function or service automatically or by request, instead of performing the function or the service by the electronic device 101, the electronic device 101 can request at least part of a function relating thereto from another device (e.g., the external electronic device 102 or 104, or the server 106). The other electronic device (e.g., the external electronic device 102 or 104, or the server 106) can perform the requested function or an additional function and send its result to the electronic device 101. The electronic device 101 can provide the requested function or service by processing the received result. In doing so, for example, cloud computing, distributed computing, or client-server computing techniques can be used.

Figure 2:
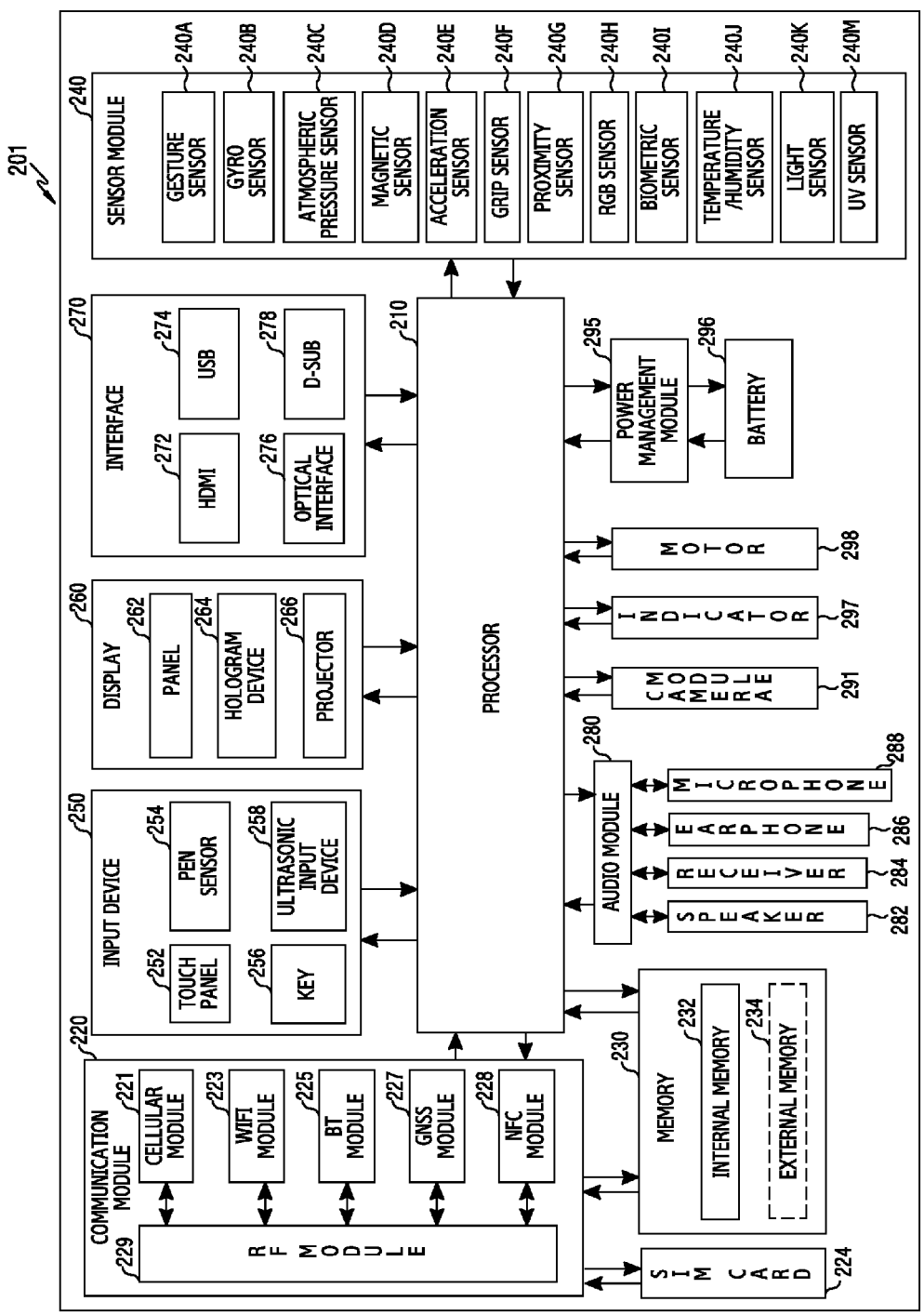
FIG. 2 is a block diagram illustrating an electronic device, according to an embodiment of the present disclosure.

FIG. 2 is a block diagram illustrating an electronic device, according to an embodiment of the present disclosure. An electronic device 201, for example, can include all or part of the above-described electronic device 101 of FIG. 1. The electronic device 201 includes one or more processors (e.g., an AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210, for example, can control a plurality of hardware or software components connected to the processor 210, and also can perform various data processing and operations by executing an OS or an application program. The processor 210 can be implemented with a system on chip (SoC), for example. The processor 210 can further include a graphic processing unit (GPU) and/or an image signal processor. The processor 210 may include at least part (e.g., a cellular module 221) of the components shown in FIG. 2. The processor 210 can load commands or data received from at least one other component (e.g., a nonvolatile memory) into a volatile memory, process them, and store various data in the nonvolatile memory.

The communication module 220 can have the same or similar configuration to the communication interface 170 of FIG. 1. The communication module 220 includes, for example, the cellular module 221, a WiFi module 223, a Bluetooth module 225, a GNSS module 227, an NFC module 228, and an RF module 229. The cellular module 221, for example, can provide voice call, video call, short message service (SMS), or Internet service through a communication network. The cellular module 221 can identify and authenticate the electronic device 201 in a communication network by using the SIM (e.g., a SIM card) 224. The cellular module 221 can perform at least part of a function that the processor 210 provides. The cellular module 221 can further include a CP. At least some (e.g., two or more) of the cellular module 221, the WiFi module 223, the BT module 225, the GNSS module 227, and the NFC module 228 can be included in one integrated circuit (IC) or an IC package. The RF module 229, for example, can transmit/receive a communication signal (e.g., an RF signal). The RF module 229, for example, can include a transceiver, a power amp module (PAM), a frequency filter, a low noise amplifier (LNA), or an antenna. According to another embodiment, at least one of the cellular module 221, the WiFi module 223, the BT module 225, the GNSS module 227, and the NFC module 228 can transmit/receive an RF signal through an additional RF module. The SIM 224, for example, can include a card including a SIM or an embedded SIM, and also can contain unique identification information (e.g., an integrated circuit card identifier (ICCID)) or subscriber information (e.g., an international mobile subscriber identity (IMSI)).

The memory 230 (e.g., the memory 130) can include at least one of an internal memory 232 and an external memory 234. The internal memory 232 can include at least one of, for example, a volatile memory (e.g., dynamic random access memory (RAM) (DRAM), static RAM (SRAM), or synchronous DRAM (SDRAM)), and a non-volatile memory (e.g., one time programmable read only memory (ROM) (OTPROM), programmable ROM (PROM), erasable and programmable ROM (EPROM), electrically erasable and programmable ROM (EEPROM), mask ROM, flash ROM, flash memory, hard drive, and solid state drive (SSD)). The external memory 234 can include flash drive, for example, compact flash (CF), secure digital (SD), micro SD, mini SD, extreme digital (xD), multimedia card (MMC), or memory stick. The external memory 234 can be functionally or physically connected to the electronic device 201 through various interfaces.

The sensor module 240 can, for example, measure physical quantities or detect an operating state of the electronic device 201, and thus convert the measured or detected information into electrical signals. The sensor module 240 includes at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a bio sensor 240I, a temperature/humidity sensor 240J, an illumination sensor 240K, and an ultraviolet (UV) sensor 240M. Additionally or alternatively, the sensor module 240 can include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 can further include a control circuit for controlling at least one sensor therein. The electronic device, as part of the processor 210 or individually, can further include a processor configured to control the sensor module 240 and thus control the sensor module 240 while the processor 210 is sleeping.

The input device 250 includes at least one of a touch panel 252, a (digital) pen sensor 254, a key 256, and an ultrasonic input device 258. The touch panel 252 can use at least one of, for example, capacitive, resistive, infrared, and ultrasonic methods. Additionally, the touch panel 252 can further include a control circuit. The touch panel 252 can further include a tactile layer to provide a tactile response to a user. The (digital) pen sensor 254 can include, for example, part of a touch panel or a sheet for recognition. The key 256 can include, for example, a physical button, a touch key, an optical key, or a keypad. The ultrasonic input device 258 can detect ultrasonic waves from an input means through a microphone 288 and check data corresponding to the detected ultrasonic waves.

The display 260 (e.g., the display 160) includes at least one of a panel 262, a hologram device 264, a projector 266, and/or a control circuit for controlling them. The panel 262 can be implemented to be flexible, transparent, or wearable, for example. The panel 262 and the touch panel 252 can be configured with one or more modules. The panel 262 can include a pressure sensor (or a force sensor) for measuring a pressure of the user touch. The pressure sensor can be integrated with the touch panel 252, or include one or more sensors separately from the touch panel 252. The hologram device 264 can show three-dimensional images in the air by using the interference of light. The projector 266 can display an image by projecting light on a screen. The screen, for example, can be placed inside or outside the electronic device 201. The interface 270 can include, for example, an HDMI 272, a USB 274, an optical interface 276, or a D-subminiature (D-sub) 278. The interface 270 can be included in, for example, the communication interface 170 of FIG. 1. Additionally or alternatively, the interface 270 can include a mobile high-definition link (MHL) interface, a SD card/MMC interface, or an infrared data association (IrDA) standard interface.

The audio module 280, for example, can convert sounds into electrical signals and convert electrical signals into sounds. At least some components of the audio module 280 can be included in, for example, the input/output interface 150 of FIG. 1. The audio module 280 can process sound information inputted or outputted through a speaker 282, a receiver 284, an earphone 286, or the microphone 288. The camera module 291, as a device for capturing still images and videos, can include one or more image sensors (e.g., a front sensor or a rear sensor), a lens, an image signal processor (ISP), or a flash (e.g., an LED or a xenon lamp). The power management module 295, for example, can manage the power of the electronic device 201. According to an embodiment of the present disclosure, the power management module 295 can include a power management IC (PMIC), a charger IC, or a battery gauge, for example. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. The battery gauge can measure the remaining capacity of the battery 296, or a voltage, current, or temperature of the battery 296 during charging. The battery 296 can include, for example, a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as digital multimedia broadcasting (DMB) and digital video broadcasting (DVB). Each of the above-described components of the electronic device can be configured with at least one component and the name of a corresponding component can vary according to the kind of an electronic device. According to an embodiment of the present disclosure, an electronic device (e.g., the electronic device 201) can be configured to include at least one of the above-described components or an additional component, or to not include some of the above-described components. Additionally, some of the components in an electronic device are configured as one entity, so that functions of previous corresponding components are performed identically.

Figure 3:
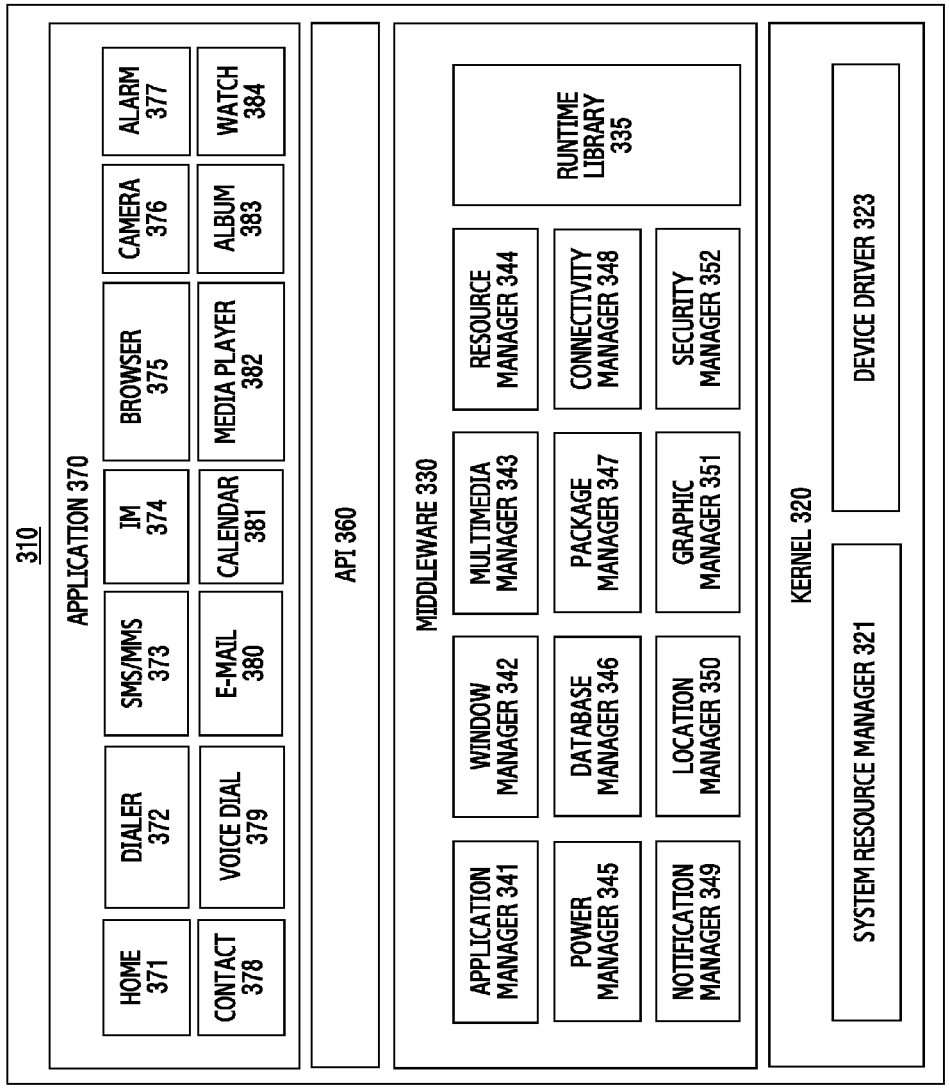
FIG. 3 is a block diagram illustrating a program module, according to an embodiment of the present disclosure.

FIG. 3 is a block diagram of a program module, according to an embodiment of the present disclosure. A program module 310 (e.g., the program 140 of FIG. 1) can include an OS for controlling a resource relating to an electronic device (e.g., the electronic device 101) and/or various applications (e.g., the application program 147 of FIG. 1) running on the OS. Referring to FIG. 3, the program module 310 includes a kernel 320 (e.g., the kernel 141 of FIG. 1), a middleware 330 (e.g., the middleware 143 of FIG. 1), an API 360 (e.g., the API 145 of FIG. 1), and an application 370 (e.g., the application program 147 of FIG. 1). At least part of the program module 310 can be preloaded on an electronic device or can be downloaded from an external electronic device (e.g., the external electronic devices 102, 104, or the server 106).

The kernel 320 includes, for example, at least one of a system resource manager 321 and a device driver 323. The system resource manager 321 can control, allocate, or retrieve a system resource. According to an embodiment, the system resource manager 321 can include a process management unit, a memory management unit, or a file system management unit. The device driver 323 can include, for example, a display driver, a camera driver, a Bluetooth driver, a sharing memory driver, a USB driver, a keypad driver, a WiFi driver, an audio driver, or an inter-process communication (IPC) driver. The middleware 330, for example, can provide a function commonly required by the application 370, or can provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include, for example, a library module used by a complier to add a new function through a programming language while the application 370 is running. The runtime library 335 can manage input/output, manage memory, or arithmetic function processing. The application manager 341, for example, can manage the life cycle of the applications 370. The window manager 342 can manage a GUI resource used in a screen. The multimedia manager 343 can recognize a format for playing various media files and encode or decode a media file by using the codec in a corresponding format. The resource manager 344 can manage a source code of the application 370 or a memory space. The power manager 345 can manage the capacity or power of the battery and provide power information for an operation of the electronic device. The power manager 345 can operate together with a basic input/output system (BIOS). The database manager 346 can create, search, or modify a database used in the application 370. The package manager 347 can manage installation or updating of an application distributed in a package file format.

The connectivity manger 348 can manage, for example, a wireless connection. The notification manager 349 can provide an event, such as incoming messages, appointments, and proximity alerts, to the user. The location manager 350 can manage location information of an electronic device. The graphic manager 351 can manage a graphic effect to be provided to the user or a user interface relating thereto. The security manager 352 can provide, for example, system security or user authentication. The middleware 330 can include a telephony manager for managing a voice or video call function of the electronic device, or a middleware module for combining various functions of the above-described components. The middleware 330 can provide a module specialized for each type of OS. The middleware 330 can dynamically delete part of the existing components or add new components. The API 360, as a set of API programming functions, can be provided as another configuration according to the OS. For example, one API set can be provided for each platform, or two or more API sets can be provided for each platform.

The application 370 includes at least one of a home 371, a dialer 372, an SMS/multimedia messaging system (MMS) 373, an instant message (IM) 374, a browser 375, a camera 376, an alarm 377, a contact 378, a voice dial 379, an e-mail 380, a calendar 381, a media player 382, an album 383, a clock 384, health care (e.g., measure an exercise amount or blood sugar level), or environmental information (e.g., air pressure, humidity, or temperature information) provision application. The application 370 can include an information exchange application for supporting information exchange between the electronic device and an external electronic device. The information exchange application can include, for example, a notification relay application for relaying specific information to the external device or a device management application for managing the external electronic device. For example, the notification relay application can relay notification information from another application of the electronic device to an external electronic device, or receive and forward notification information from an external electronic device to the user. The device management application, for example, can install, delete, or update a function (e.g., turn-on/turn off of the external electronic device itself (or some components) or display brightness (or resolution) adjustment) of an external electronic device communicating with the electronic device, or an application operating in the external electronic device. The application 370 can include a specified application (e.g., a health care application of a mobile medical device) according to a property of the external electronic device. The application 370 can include an application received from an external electronic device. At least part of the program module 310 can be implemented (e.g., executed) with software, firmware, hardware (e.g., the processor 210), or a combination of at least two of them, and include a module, a program, a routine, a set of instructions, or a process for executing one or more functions.

The term "module", as used herein, can imply a unit including hardware, software, and firmware, or any suitable combination. The term "module" can be interchangeably used with terms such as "unit", "logic", "logical block", "component", "circuit", and the like. A module can be a minimum unit of an integral component or can be a part thereof. A module can be a minimum unit for performing one or more functions or may be a part thereof. A module can be mechanically or electrically implemented. For example, a module, according to an embodiment of the present disclosure, can include at least one of an application-specific integrated circuit (ASIC) chip, a field programmable gate arrays (FPGAs), and a programmable-logic device, which are known or will be developed, and which perform certain operations.

At least some parts of a device (e.g., modules or functions thereof) or a method (e.g., operations), based on embodiments of the present disclosure, can be implemented with an instruction stored in a non-transitory computer-readable storage medium (e.g., the memory 130) as a program module. When the instruction is executed by a processor (e.g., the processor 120), the processor can perform a function corresponding to the instruction. The non-transitory computer readable recording medium can include, for example, a hard disk, a floppy disc, a magnetic medium (e.g., a magnetic tape), an optical storage medium (e.g., a compact disc-ROM (CD-ROM) or a DVD, a magnetic-optic medium (e.g., a floptical disc)), and an internal memory. The instruction can include code created by a compiler or code executable by an interpreter.

The module or program module can further include at least one or more components among the aforementioned components, or can omit some of them, or can further include additional other components. Operations performed by a module, program module, or other components of the various embodiments of the present disclosure can be executed in a sequential, parallel, repetitive, or heuristic manner. In addition, some of the operations can be executed in a different order or may be omitted, or other operations may be added.

Embodiments (for example, including a camera function) of the present disclosure relate to an electronic device and an operation method thereof. The electronic device may include a plurality of image sensors having different operation speeds. The electronic device may acquire the same line image data or images related to line images by synchronizing the operation speeds of the image sensors.

In the following description, the term "row access period (RAP)" may include a row exposure time and a row readout time of the image sensor. The term "row exposure time" may be a time for which light sensing devices connected to selected row lines of the image sensor detect incident light and accumulate electric charges (electron hole pair "EHP"). The term "row readout time" may be a readout time for which the electric charges (pixel signals) accumulated by the light sensing devices of the row lines is output to column lines after the row exposure time ends. The term "synchronized row access period (SRAP)" may include a row exposure time, a row readout time, and/or a blank time of a first line of the image sensor.

In various embodiments of the present disclosure described below, an electronic device, a wearable device, and a device are distinguished for convenience of description. In a state where the electronic device and the wearable device are connected, a function corresponding to the device is performed through a link between the electronic device and the wearable device according to a connection, or the connection between the electronic device and the device is released. However, the wearable device and the device may be included in a range of the electronic device, and the operation linked between the electronic devices may be performed by various electronic devices as well as the wearable device and the device. For example, the electronic device may include all devices using one or more of various processors (for example, the processors 120 and 210) such as an AP, a CP, a GPU, and a CPU including all information and communication devices, multimedia devices, wearable devices, and application devices thereof that support functions according to various embodiments of the present disclosure.

Hereinafter, various embodiments of the present disclosure will be described based on a hardware approach. However, various embodiments of the present disclosure include a technology that uses both hardware and software, and thus, the various embodiments of the present disclosure may not exclude the perspective of software.

Figure 4:
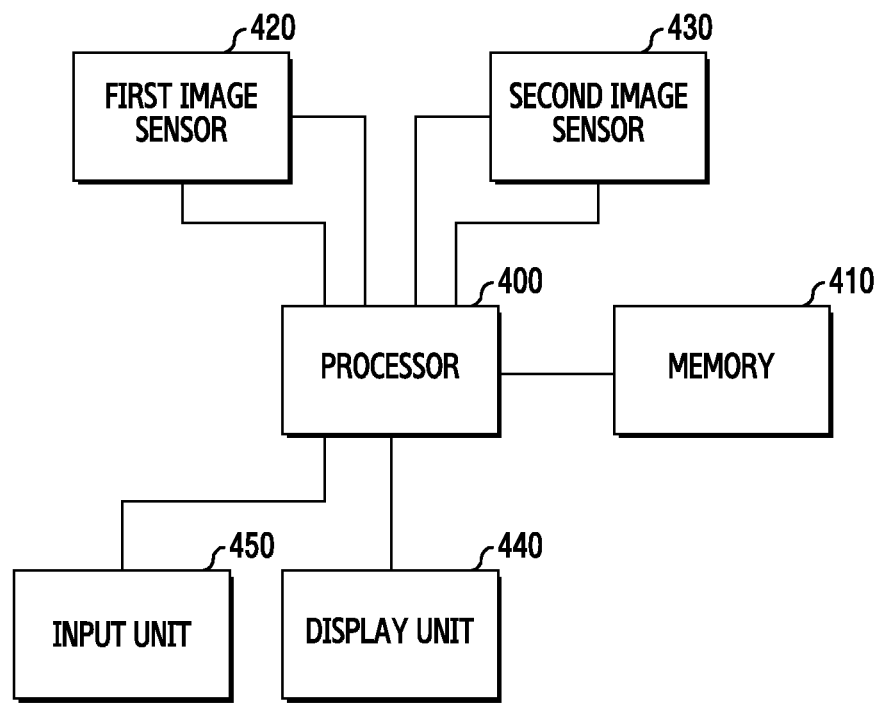
FIG. 4 is a diagram illustrating a configuration of an electronic device including a plurality of image sensors, according to an embodiment of the present disclosure.

FIG. 4 is a diagram illustrating a configuration of an electronic device including a plurality of image sensors, according to an embodiment of the present disclosure. The electronic device of FIG. 4 may be configured with a dual image sensor.

Referring to FIG. 4, the electronic device includes a processor 400, a memory 410, a first image sensor 420, a second image sensor 430, a display unit 440, and an input unit 450.

The processor 400 may be the processor 120 of FIG. 1 or the processor 210 of FIG. 2. When a dual camera is driven, the processor 400 may synchronize access periods of image sensors and process frame and line data acquired by the plurality of image sensors operating according to the synchronized access period.

The memory 410 may be the memory 130 of FIG. 1 or the memory 230 of FIG. 2. The memory 410 may include a table that stores information and data for synchronizing the access periods of the plurality of image sensors.

The first image sensor 420 may be a partial configuration of the input/output interface 150 of FIG. 1 and the camera module 291 of FIG. 2. The first image sensor 420 may include a row driver, a pixel array, and a column driver. The access period of the first image sensor 420 may be controlled by the processor 400 and pixel signals of a first image may be generated.

The second image sensor 430 may be a partial configuration of the input/output interface 150 of FIG. 1 and the camera module 291 of FIG. 2. The second image sensor 430 may include a row driver, a pixel array, and a column driver. The access period of the second image sensor 430 may be controlled by the processor 400 and pixel signals of a second image may be generated.

The display unit 440 may be the display 160 of FIG. 1 or the display 260 of FIG. 2. The display unit 440 may display image data acquired by the first image sensor 420 and the second image sensor 430.

The input unit 450 may be a partial configuration of the input/output interface 150 of FIG. 1 and the input device 250 of FIG. 2. The input unit 450 may make an input for controlling the operation of the electronic device or input data.

Although FIG. 4 illustrates the configuration of the electronic device including the two image sensors 420 and 430, the electronic device may include two or more image sensors. The processor 400 may acquire independent images by operating the first image sensor 420 and the second image sensor 430 at different times. The processor 400 may acquire the same image or relevant images by simultaneously operating the first image sensor 420 and the second image sensor 430. For example, the first image sensor 420 may acquire a first image of 2D RGB data, and the second image sensor 430 may acquire a second image of depth data (depth information, for example, information on a distance between a camera and a subject) of the same subject. Further, the processor 400 may combine the first image and the second image acquired by the first image sensor 420 and the second image sensor 430 to generate a 3D image. According to an embodiment of the present disclosure, the first image sensor 420 and the second image sensor 430 may acquire the first image and the second image having different view angles. Further, the processor 400 may generate images of a wide view angle such as panorama views by processing the first image and the second image acquired by the first image sensor 420 and the second image sensor 430.

The first image sensor 420 and/or the second image sensor 430 may have a structure of complementary metal oxide semiconductor (CMOS) or charged coupled device (CCD) (e.g., CMOS image sensor (CIS) or CCD image sensor), and such a type of image sensors may include a pixel array and a part for controlling (row control) and reading (readout) the pixel array. A block (row control block) of the image sensor for controlling the pixel array in the image sensor controls an operation of accumulating electric charges in a light sensing device (for example, photo diode) of the pixel array during a predetermined exposure time after a reset of pixels and perform a function of generating a signal for reading the accumulated electric charges. An output module (column readout block) may perform an operation for converting a signal (analog pixel signal) accumulated in the light sensing device for a row exposure time into a digital signal through an analog to digital converter (ADC). The converted digital data may be output to the outside (for example, the processor 400) through an external interface such as a Mobile Industry Processor Interface (MIPI) through an internal digital block of the image sensor.

The first image sensor 420 and the second image sensor 430 may use a rolling shutter.

Figure 5A:
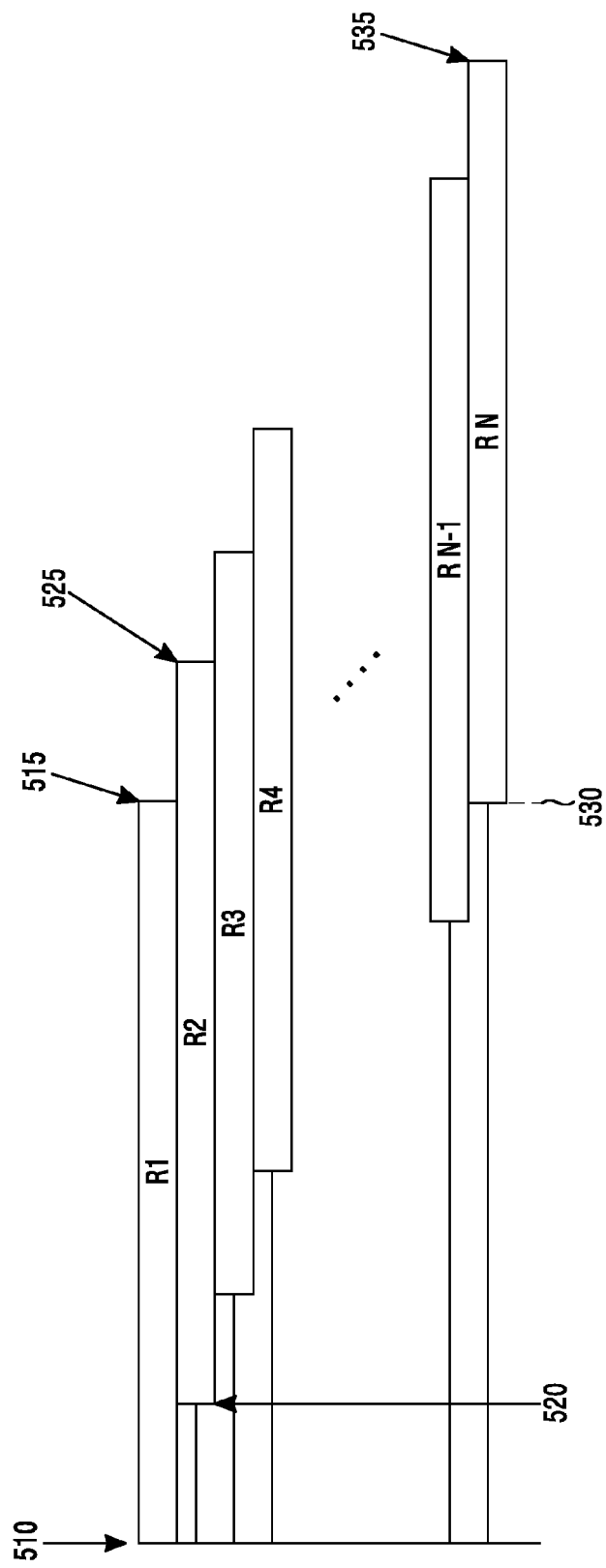
FIGS. 5A and 5B are diagrams illustrating scan examples of image sensors in an electronic device, according to an embodiment of the present disclosure.
Figure 5B:
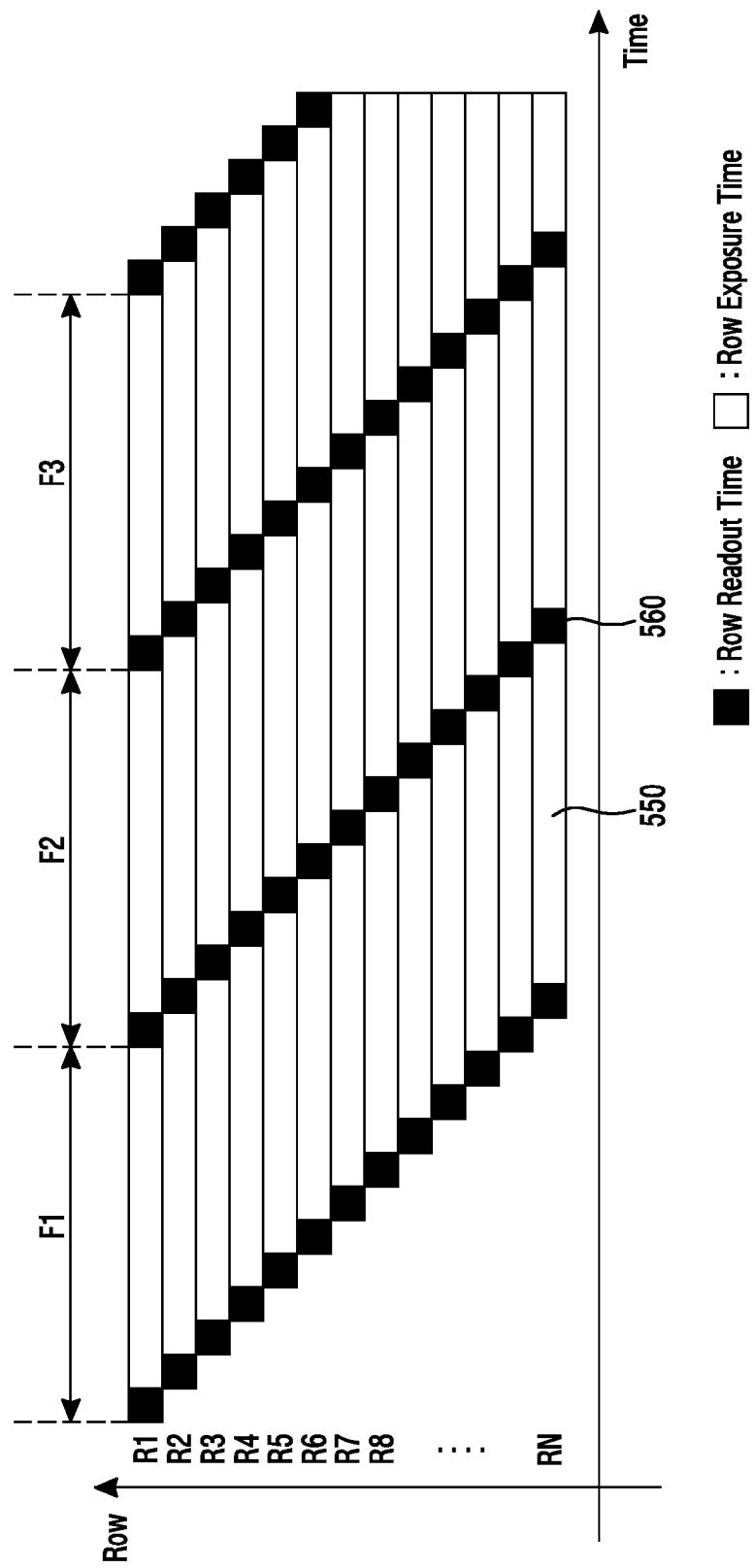

FIGS. 5A and 5B are diagrams illustrating scan examples of image sensors in the electronic device, according to an embodiment of the present disclosure.

Referring to FIG. 5A, the first image sensor 420 and/or the second image sensor 430 may include a pixel array having N row lines and perform a scan row by row. In a scan operation of the first row line, the first image sensor 420 and/or the second image sensor 430 may begin exposure at a time point 510 (beginning of exposure of first row) and end exposure at a time point 515 (end of exposure of first row). In a scan operation of the second row line, the first image sensor 420 and/or the second image sensor 430 may begin exposure at a time point 520 after a preset line delay time (1 line delay time) from the time point 510 and end exposure at a time point 525 (end of exposure of second row). The line delay time may be a line delay time for activating exposure of row lines. Through such a scheme, in a scan operation of the $N^{th}$ row line, the first image sensor 420 and/or the second image sensor 430 may begin exposure at a time point 530 after a N line delay time (N*line delay time) from the time point 510 and end exposure at a time point 535 (end of exposure of $N^{th}$ row). As illustrated in FIG. 5A, the first image sensor 420 and/or the second image sensor 430 may select row lines of the pixel array while delaying a set time, so as to accumulate electric charges in the light sensing device.

Referring to FIG. 5B, the first image sensor 420 and/or the second image sensor 430 may sequentially select row lines and activate a row exposure time 550, and output an electric charge value (pixel signal) accumulated in the light sensing device of the corresponding line to a column line by activating a row readout time 560 at a time point when the exposure time 550 ends. When the readout time 560 ends, the exposure time may be activated to generate a pixel signal of a next frame. For example, the image sensor using a rolling shutter scheme may sequentially select row lines, and there may be a difference between time points when pixel information of the row lines is read, as illustrated in FIG. 5B.

The electronic device including a plurality of image sensors may acquire a plurality of images by simultaneously driving the image sensors. At this time, the acquired images may be the same images or relevant images (for example, a 2D color image and depth data, images having different view angles, and the like). However, when the plurality of images are acquired, synchronization may not be made. For example, even when frame synchronization between the first image sensor 420 and the second image sensor 430 is made, line synchronization may fail. For example, the line synchronization between the image sensors may fail when operation speeds of the image sensors (exposure time and/or readout time) are different, resolutions of the image sensors are different, there is a sensor operating in a binning mode in the image sensors, or even when the frame synchronization of the image sensors is made. First, when the operation speeds are different, the image sensors may make the line synchronization at a time point of the first row line, but there may be an access period difference between subsequent row lines (particularly, the last $N^{th}$ row). Second, when the resolutions of the images are different, the number of row lines of the pixel array may be different. Therefore, when the row line is accessed, image data of lines having different images may be generated and output. Third, when the image sensors operate in the binning mode, different images may be generated and output at a time point when the row line is accessed.

The electronic device, according to embodiments of the present disclosure, may include a plurality of image sensors, and may acquire image data of which frame synchronization and line synchronization have been made by controlling operations of the image sensors.

Figure 6:
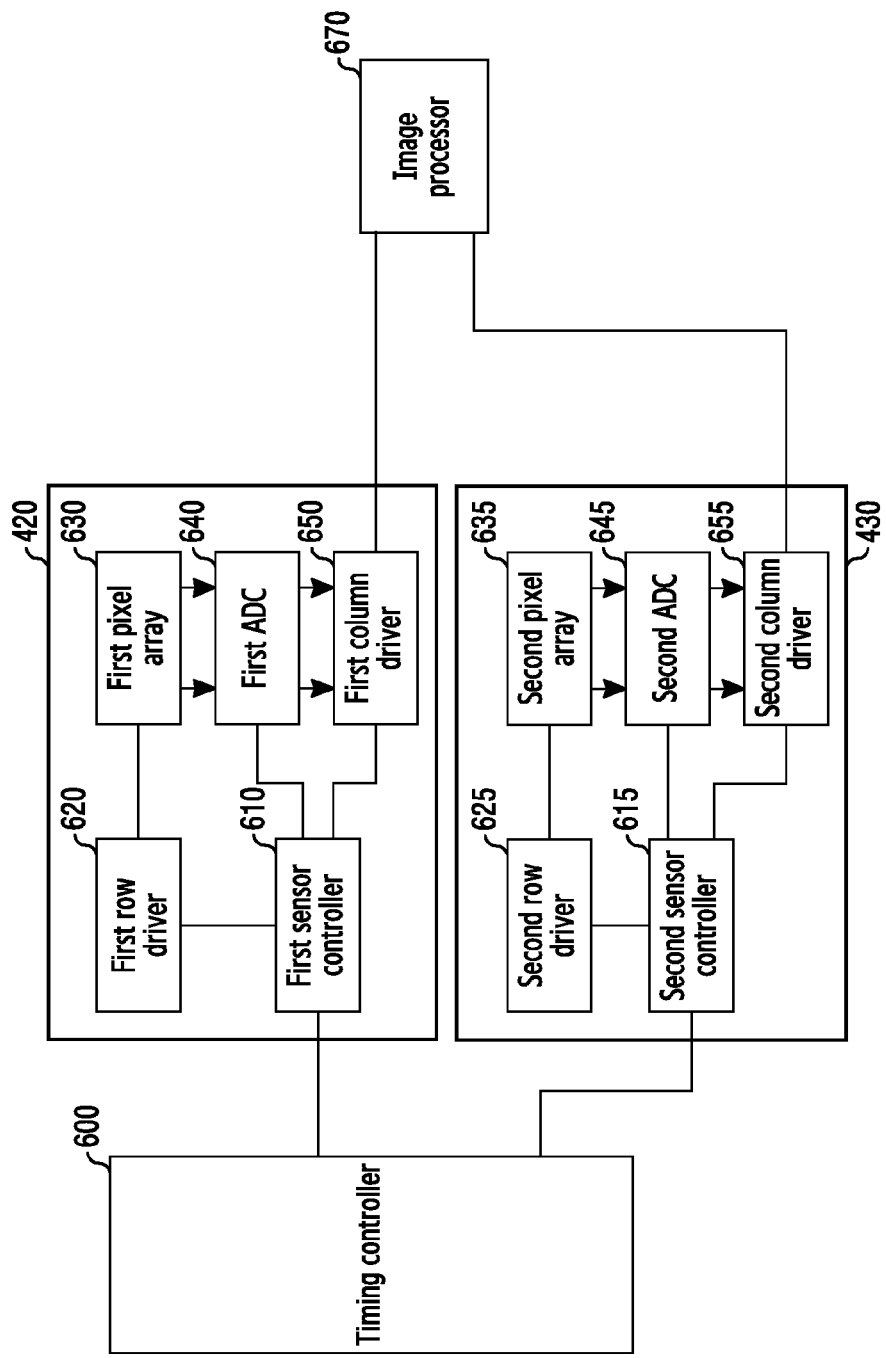
FIG. 6 is a block diagram illustrating a configuration of an electronic device for driving a plurality of image sensors, according to an embodiment of the present disclosure.

FIG. 6 is a block diagram illustrating a configuration of an electronic device for driving a plurality of image sensors, according to an embodiment of the present disclosure.

Referring to FIG. 6, the electronic device includes a timing controller 600, a first sensor controller 610, a first row driver 620, a first pixel array 630, a first converter 640, a first column driver 650, a second sensor controller 615, a second row driver 625, a second pixel array 635, a second converter 645, a second column driver 655, and an image processor 670.

The timing controller 600 may output information for controlling access of the first image sensor 420 and the second image sensor 430. The timing controller 600 may generate a timing control signal for controlling performance of frame synchronization and line synchronization of the first image sensor 420 and the second image sensor 430 according to operation speeds (exposure time and readout time), resolutions, and operation modes (for example, binning mode) of the image sensors.

The first sensor controller 610 may control the operation of the first image sensor 420 using the timing control signal output form the timing controller 600. The first pixel array 630 may be a pixel array of the first image sensor 420. The first row driver 620 may set a row exposure time of the first pixel array 630 by a first row access control signal RAP 1 of the first sensor controller 610 and set a row readout time for reading out pixel information of the row line to a column line. A light sensing device connected to the selected row line of the first pixel array 630 may detect and accumulate light as a pixel signal for the row exposure time and read out the pixel signal to the column line at the row readout time. The first converter 640 may convert the pixel signal read out to the column line into digital data. The first column driver 650 may transfer the digital data converted by the first converter 640 to the image processor 670 through an MIPI scheme. The first row access control signal RAP 1 may be a signal for controlling the exposure time and the readout time of row lines of the first pixel array 630.

The second sensor controller 615 may control the operation of the second image sensor 430 using the timing control signal output from the timing controller 600. The second pixel array 635 may be a pixel array of the second image sensor 430. The second row driver 625 may set a row exposure time of the second pixel array 635 by a second row access control signal RAP 2 of the second sensor controller 615 and set a row readout time for reading out pixel information of the row line to a column line. A light sensing device connected to the selected row line of the second pixel array 635 may detect and accumulate light as a pixel signal for the row exposure time and read out the pixel signal to the column line at the row readout time. The second converter 645 may convert the pixel signal read out to the column line into digital data. The second column driver 655 may transfer the digital data converted by the second converter 645 to the image processor 670 through an MIPI scheme. The second row access control signal RAP 2 may be a signal for controlling the exposure time and the readout time of row lines of the second pixel array 635.

The image processor 670 may process a pixel signal in the unit of lines read out from the first image sensor 420 and the second image sensor 430. The timing controller 600 and the image processor 670 may be elements of the processor 400 or may be independent from the processor 400.

The first image sensor 420 and the second image sensor 430 may perform different access operations. The access operation may vary depending on the operation speed, the resolution, and/or the operation mode. The processor 400 may analyze the access operations (the operation speed, the resolution, and/or the operation mode) of the first image sensor 420 and the second image sensor 430, and generate a first row access control signal and a second row access control signal for synchronizing frame and line data of the first image sensor 420 and the second image sensor 430 according to a result of the analysis. The operation speed may be determined according to the row exposure time and the row readout time of the image sensor.

First, the first image sensor 420 and the second image sensor 430 may be different operation speeds. The operation speed may vary depending on a row exposure time for which the light sensing device of the image sensor accumulates the pixel signal and a row readout time in which the light sensing device reads out the pixel signal of the row line. The first image sensor 420 and the second image sensor 430 may have different row exposure times. Further, the first image sensor 420 or the second image sensor 430 may have an exposure change caused by an auto exposure control. When the row exposure times of the first image sensor 420 and the second image sensor 430 are different, the processor 400 may synchronize row access periods while maintaining the exposure time corresponding to each of the first image sensor 420 and the second image sensor 430. For example, when the row exposure time of the second image sensor 430 is ½ of the row exposure time of the first image sensor 420, the second image sensor 430 may activate the row exposure time of the second image sensor 430 in the ½ exposure time period of the first image sensor 420 and maintain the row exposure time in a blank state during the remaining ½ exposure time period of the first image sensor 420, so as to synchronize the exposure periods of the two image sensors. When the row exposure times of the first image sensor 420 and the second image sensor 430 are different, the processor 400 may control the exposure times of the first image sensor 420 and the second image sensor 430 to be different and process the remaining exposure intervals of the image sensor having the exposure time of a faster period to be blank, so as to synchronize the access periods of the row lines of the two image sensors. When the exposure change is generated, the processor 400 may analyze exposure information of the image sensors and generate row access period control signals of the image sensors based on information on the image sensors (for example, a clock speed, line_length_pck, and frame_length_line) that has been already stored in the memory 410 or is given as an input.

Secondly, the operation speed may vary depending on a low readout time. The first image sensor 420 and the second image sensor 430 may have different readout speeds. When the readout speeds of the two image sensors are different, the processor 400 may synchronize a first row access period and a second row access period. For example, when the readout time of the second image sensor 430 is ½ of the readout time of the first image sensor 420 (when the readout speed of the second image sensor 430 is faster and the readout time of the second image sensor 430 is shorter), the processor 400 may control a readout operation of the second image sensor 430 during ½ of the readout time period of the first image sensor 420 and maintain a horizontal blank state during the remaining ½ readout time period (a time for which the readout operation of the first image sensor 420 is performed), so as to synchronize the readout times of the two image sensors.

The first image sensor 420 and the second image sensor 430 may have different row exposure times and row readout times. When accessing the row line of the image sensor (for example, the first image sensor) having the shorter row exposure time and row readout time, the processor 400 may include a horizontal blank interval for synchronization with the row line access period of the other image sensor (for example, the second image sensor).

One image sensor (for example, the first image sensor) between the two image sensors may have a shorter exposure time and the other image sensor (for example, the second image sensor) may have a shorter readout time. When synchronizing the row access periods, the processor 400 may change both the exposure time (for example, the exposure time of the first image sensor) and the readout time (for example, the readout time of the second image sensor). The processor 400 may synchronize the row access periods by changing one of the exposure time and the readout time.

For example, the processor 400 may insert the changed readout time into a blank time of the exposure period of the first image sensor.

Thirdly, the first image sensor 420 and the second image sensor 430 may have different resolutions (for example, different numbers of row lines). When resolutions of the image sensors are different (for example, first image sensor Row#=N and second image sensor Row#=M), speeds of reading each row line of the image sensors may be the same but times for reading all row lines may be different. The processor 400 may analyze the resolutions of the first image sensor 420 and the second image sensor 430 and control row access periods based on the analyzed resolutions. For example, when the number of row lines of the first image sensor 420 is twice the number of row lines of the second image sensor 430, the processor 400 may synchronize row line access by accessing the row lines of the second image sensor 430 one by one in the period during which the two row lines of the first image sensor 420 are accessed. When the first image sensor 420 and the second image sensor 430 have different resolutions, the processor 400 may synchronize images acquired by the plurality of image sensors by synchronizing times for corresponding row lines (row lines corresponding to the same image area in the image).

Fourthly, the first image sensor 420 and the second image sensor 430 may operate in different operation modes. For example, the first image sensor 420 may operate in a general mode, and the second image sensor 430 may operate in a binning mode. A plurality of row lines of the image sensor operating in the binning mode may be activated according to a preset binning area (for example, 2*2 pixel, 3*3 pixel . . . ), and thus, an exposure operation may be performed. When the first image sensor 420 and the second image sensor 430 operate in different operation modes, the processor 400 may synchronize images acquired by the plurality of image sensors by synchronizing times for corresponding row lines (row lines corresponding to the same image area in the image).

Further, as necessary, a blanking interval included in the first image sensor 420 and the second image sensor 430 may be applied differently between frames. For example, first frame access may be performed using a first blanking interval and second frame access may be performed using a second blanking interval that is different from the first blanking interval.

When the first image sensor 420 or the second image sensor 430 operates in a crop mode, final outputs (image sizes) of the two image sensors may be different. When the image sensor is operating in the crop mode among the image sensors, the processor 400 may set a row access period control signal by a given table or equation and control the image sensors based on the set row access period control signal.

An electronic device according to various embodiments of the present disclosure may include a first image sensor, a second image sensor, and a processor functionally connected to the first image sensor and the second image sensor. The processor may identify a first operation characteristic corresponding to the first image sensor and a second operation characteristic corresponding to the second image sensor, change at least one value of a first access period of a first row of the first image sensor and a second access period of a second row of the second image sensor corresponding to the first row based on a difference between the first operation characteristic and the second operation characteristic to synchronize the first access period and the second access period, acquire image data of an external object corresponding to the first row through the first image sensor based on the synchronized first access period, and acquire image data of an external object corresponding to the second row through the second image sensor based on the synchronized second access period.

The first operation characteristics and the second operation characteristics may include a row readout time. The processor may synchronize the first access period and the second access period by inserting a blanking interval into a row readout time period of the image sensor having a shorter row readout time between the first image sensor and the second image sensor based on a difference between the row readout times.

The first operation characteristics and the second operation characteristics may include a row exposure time. The processor may synchronize the first access period and the second access period by inserting a blanking interval into a row exposure time period of the image sensor having a shorter row exposure time between the first image sensor and the second image sensor based on a difference between the row exposure times.

The first operation characteristic and the second operation characteristic may include an access period including a row exposure time and a row readout time. The processor may synchronize the first access period and the second access period by inserting a blanking interval into the access period of the image sensor having a shorter access period between the first image sensor and the second image sensor based on a difference between the access periods.

The first operation characteristic and the second operation characteristic may include a resolution. The processor may analyze the numbers of row lines of the first image sensor and the second image sensor based on a different between the resolutions, and synchronize the row access periods by performing blanking such that the access period of the image sensor having a lower resolution is synchronized with a corresponding row line of the image sensor having the larger number of row lines. When the first image sensor has a resolution of N row lines, the second image sensor has a resolution of M row lines, and N>M, the processor may synchronize the first access period and the second access period by performing blanking such that the row access period of the second image sensor becomes N/M times of the row access period.

The first operation characteristic and the second operation characteristic may include a normal mode and a binning mode. The processor may analyze a binning area of the image sensor operating in the binning mode and synchronize an access period of the image sensor operating in the binning mode such that binning pixels match a corresponding row line of the image sensor operating in the normal line. The binning area may correspond to (2n)*(2m), where n and m may be integers larger than or equal to 2 The processor may synchronize the access period of the image sensor operating in the binning mode such that two accesses are made in 2n access periods of the image sensor operating in the normal mode. The image sensor operating in the binning mode may further include a column circuit, and the column circuit may combine and read out equal color pixel signals read out to a column line of thee binning area.

The electronic device may further include a memory configured to store access period information according to the first operation characteristic and the second operation characteristic. The processor may analyze the access period information according to the first operation characteristic and the second operation characteristic in the memory and determine the first access period and the second access period.

Further, as necessary, a blanking interval inserted into the first image sensor and the second image sensor may be differently applied between frames. For example, first frame access may be performed using a first blanking interval and second frame access may be performed using a second blanking interval which is different from the first blanking interval.

Figure 7:
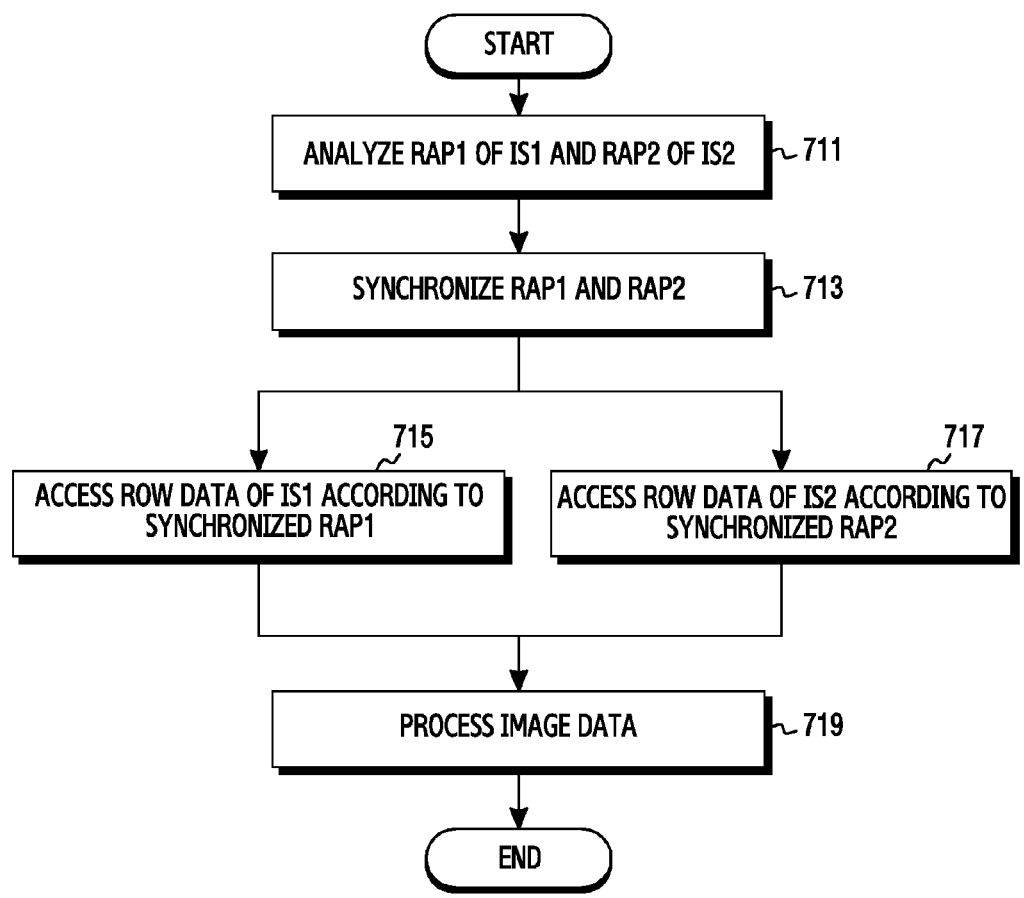
FIG. 7 is a flowchart illustrating an operation method of an electronic device, according to an embodiment of the present disclosure.

FIG. 7 is a flowchart illustrating an operation method of an electronic device, according to an embodiment of the present disclosure.

Referring to FIG. 7, the electronic device includes the first image sensor 420 and the second image sensor 430. The first image sensor 420 and the second image sensor 430 may be installed to be spaced apart from the electronic device with a predetermined interval therebetween. The first image sensor 420 and the second image sensor 430 may be driven at the same time, and generate images of different view angles and combine the generated images into one image. The first image sensor 420 and the second image sensor 430 may be different types of image sensors. For example, the first image sensor 420 may be a sensor that may acquire a two-dimensional color image, and the second image sensor 430 may be a sensor that may acquire depth information of the image acquired by the first image sensor 420. The first image sensor 420 and the second image sensor 430 may have different row access periods. The row access period may be an exposure time of the row line image and a time during which pixel information accumulated for the exposure time is read out. The first image sensor 420 and the second image sensor 430 may have different resolutions. The first image sensor 420 and the second image sensor 430 may operate in different operation modes.

The processor 400 may simultaneously drive the first image sensor 420 and the second image sensor 430. When the first image sensor 420 and the second image sensor 430 are driven, the processor 400 analyzes row access periods (RAPs) of the first image sensor 420 and the second image sensor 430, in operation 711. The RAP may vary depending on a row exposure time and a row readout time of the image sensor, depending on a resolution of the image sensor, or depending on an operation mode of the image sensor. When the row exposure times, the row readout times, the resolutions, and the operation modes of the first image sensor 420 and the second image sensor 430 are the same, the processor 400 sets the RAP of the first image sensor 420 as RAP1 and the RAP of the second image sensor 430 as RAP2, in operation 713. However, when at least one of the row exposure times, the row readout times, the resolutions, and the operation modes of the first image sensor 420 and the second image sensor 430 is different, the processor 400 obtains line synchronization by synchronizing the RAP1 of the first image sensor 420 and the RAP2 of the second image sensor 430. For example, when an operation speed of the second image sensor 430 is faster than an operation speed of the first image sensor 420, the processor 400 may synchronize the RAP of the second image sensor 430 with the RAP of the first image sensor 420. Additionally, when the resolution of the second image sensor 430 is lower than the resolution of the first image sensor 420, the processor 400 may synchronize the RAP of the second image sensor 430 with a corresponding row line of the first image sensor 420. Further, when the second image sensor 430 operates in the binning mode, the processor 400 may synchronize the RAP of the second image sensor 430 with a corresponding row line of the first image sensor 420.

After synchronizing the RAP1 of the first image sensor 420 and the RAP2 of the second image sensor 430, the processor 400 accesses row data of the first image sensor 420 by controlling the first image sensor 420 with the synchronized RAP1, in operation 715, and accesses row data of the second image sensor 430 by controlling the second image sensor 430 with the synchronized RAP2, in operation 717. The processor 400 generates line-synchronized image data by processing line data accessed by the first image sensor 420 and line data accessed by the second image sensor 430, in operation 719.

The line access periods SRAP1 and SRAP2 synchronized in operation 713 of FIG. 7 may be synchronized with an access period of the same line and may be synchronized with an access period of row lines corresponding to the image sensors. For example, when the row exposure times or the row readout times of the first image sensor 420 and the second image sensor 430 are different, the processor 400 may synchronize the row exposure time periods by blanking some of the row exposure time of the row access period RAP or synchronize the row readout time periods by blanking some of the row readout time. When the resolutions or the operation modes of the first image sensor 420 and the second image sensor 430 are different, the processor 400 may synchronize row lines corresponding to the same row line image in a frame area by controlling activation of the row lines of the RAP.

An operation for the case in which the row readout times of the first image sensor 420 and the second image sensor 430 are different is described in detail below.

Figure 8A:
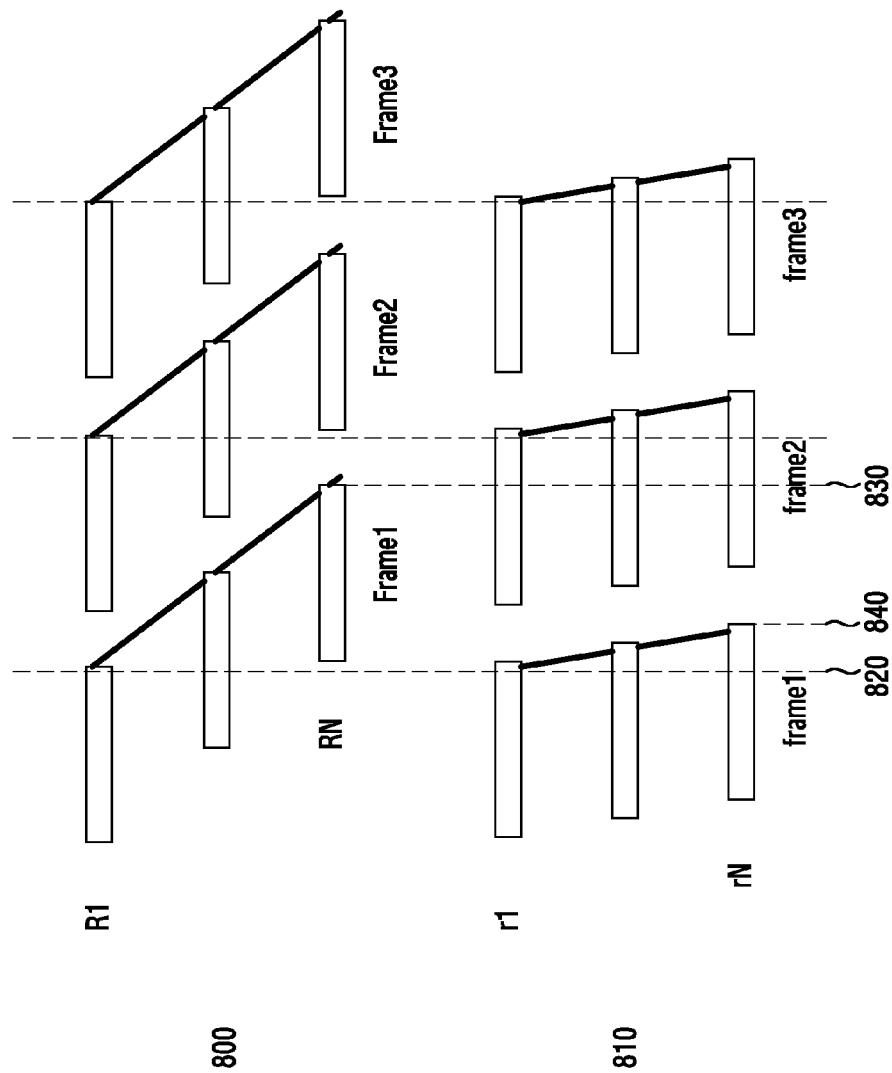
FIGS. 8A and 8B are diagrams illustrating row line access operations of image sensors having different readout speeds, according to an embodiment of the present disclosure.
Figure 8B:
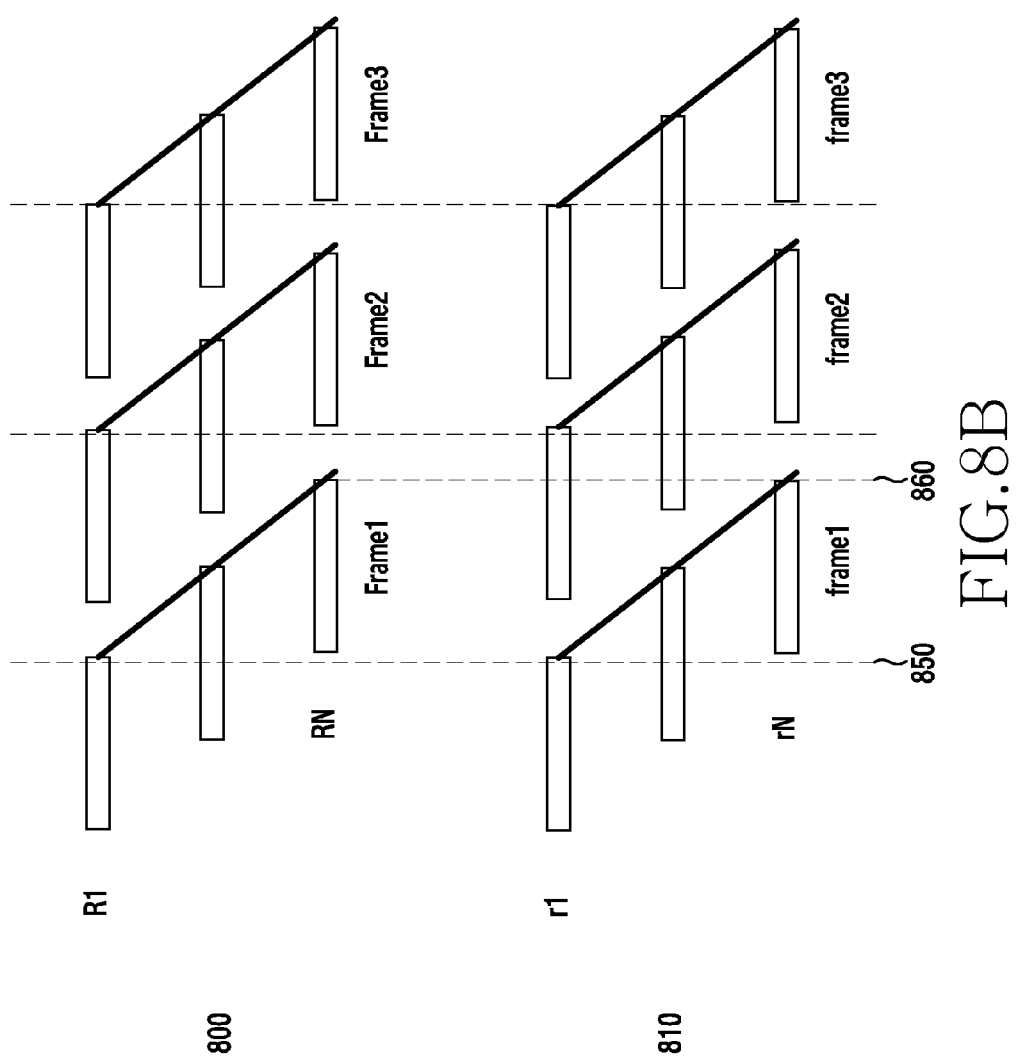

FIGS. 8A and 8B are diagrams illustrating row line access operations of image sensors having different readout speeds, according to an embodiment of the present disclosure.

Referring to FIG. 8A, a reference numeral 800 indicates a row line access of the first image sensor 420, and a reference numeral 810 indicates a row line access of the second image sensor 430. Each of the first image sensor 420 and the second image sensor 430 may include a pixel array having N row lines, and row exposure times of the lines may be in the same state. However, in FIG. 8A, the first image sensor 420 and the second image sensor 430 have different readout times of pixel signals accumulated for the exposure time. FIG. 8A illustrates an example in which the row readout time of the first image sensor 420 is longer than the row readout time of the second image sensor 430.

When readout times of pixel signals are different, row line synchronization may fail even though the frame synchronization is made. For example, even though the synchronization is made on the first row line, as indicated by a reference numeral 820 in FIG. 8A, the line synchronization may fail by different row readout times, and a time difference may become larger on the last row line ($N^{th}$ row line), as indicated by reference numerals 830 and 840. When the line synchronization fails, the processor 400 may not make the line synchronization when line images acquired by the image sensors are processed and, accordingly, the final result performance may deteriorate.

Referring to FIG. 8B, when row readout times of the first image sensor 420 and the second image sensor 430 are different, the processor 400 may synchronize the row access period of the image sensor having a shorter row readout time with the row access period of the image sensor having a longer row readout time. For example, when row exposure times of the first image sensor 420 and the second image sensor 430 are the same and the row readout time of the first image sensor 420 has a row readout time two times longer than a row readout time of the second image sensor 430, the processor 400 may increase the row readout time period of the second image sensor 430 by two times and including a blank interval corresponding to the row readout time in the row readout time period, so as to make synchronization with the row access period of the first image sensor 420. Then, in a state where line synchronization of the first line R1 is made as indicated by a reference numeral 850 of FIG. 8B, line synchronization up to the last $N^{th}$ row line may be made as indicated by a reference numeral 860.

Figure 9:
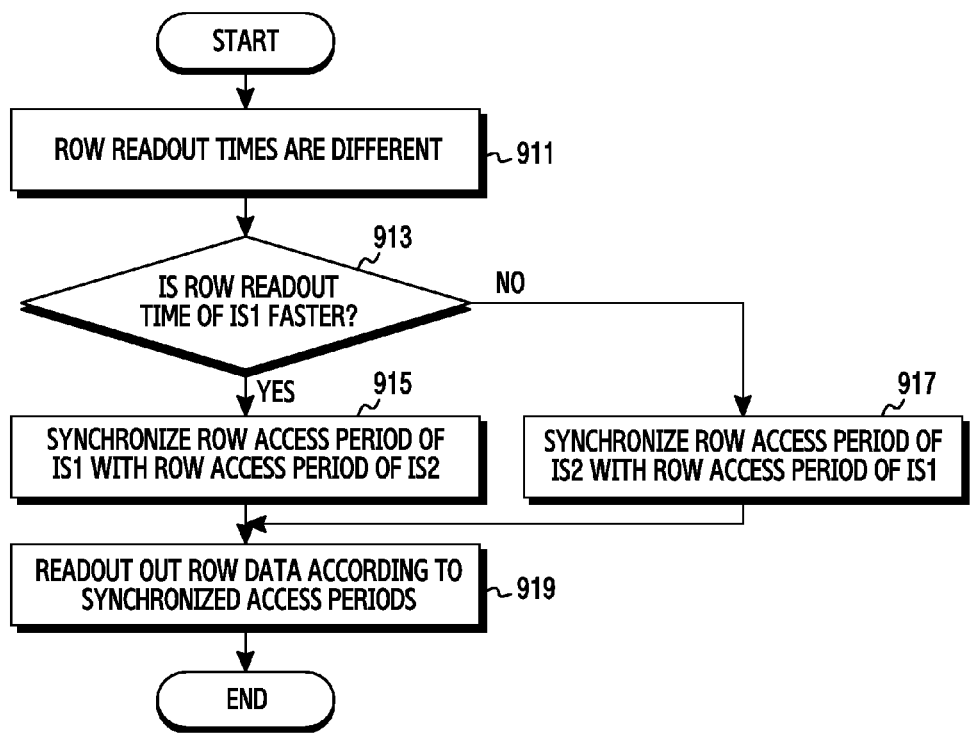
FIG. 9 is a flowchart illustrating a process by which an electronic device synchronizes row access operations of image sensors having different row readout times, according to an embodiment of the present disclosure.

FIG. 9 is a flowchart illustrating a process in which the electronic device synchronizes row access operations of image sensors having different row readout times, according to an embodiment of the present disclosure.

Referring to FIG. 9, when the first image sensor 420 and the second image sensor 430 are driven, the processor 400 may analyze operation characteristics of the two image sensors. When row readout times of the first image sensor 420 and the second image sensor 430 are different, the processor 400 recognizes the difference, in operation 911. When the row readout times of the two image sensors are different, the processor 400 may analyze the row readout times of the two image sensors, and determines whether a row readout time of the first image sensor 420 is faster, in operation 913. When the row readout time of the first image sensor 420 is faster, the processor 400 synchronizes the RAP1 of the first image sensor 420 with the RAP2 of the second image sensor 425, in operation 915. When the row readout time of the second image sensor 425 is faster, the processor 400 synchronizes the RAP2 of the second image sensor 430 with the RAP1 of the first image sensor 420, in operation 917. After synchronizing the RAP1 and RAP2, the processor 400 reads out the first image sensor 420 and the second image sensor 430 according to the synchronized row access periods, in operation 919.

FIGS. 10A to 10E are diagrams illustrating a method of synchronizing row readout times of image sensors, according to an embodiment of the present disclosure.

Figure 10A:
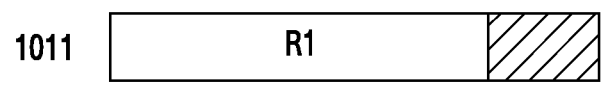
FIGS. 10A to 10E are diagrams illustrating a method of synchronizing row readout times of image sensors, according to an embodiment of the present disclosure.
Figure 10A:
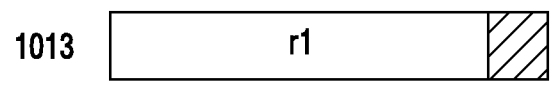
Figure 10A:
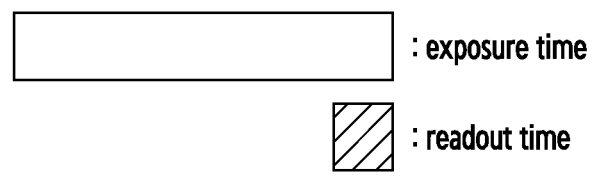

Referring to FIG. 10A, a reference numeral 1011 indicates the RAP1 of the first image sensor 420 and a reference numeral 1013 indicates the RAP2 of the second image sensor 430 having a different row readout time.

Figure 10B:
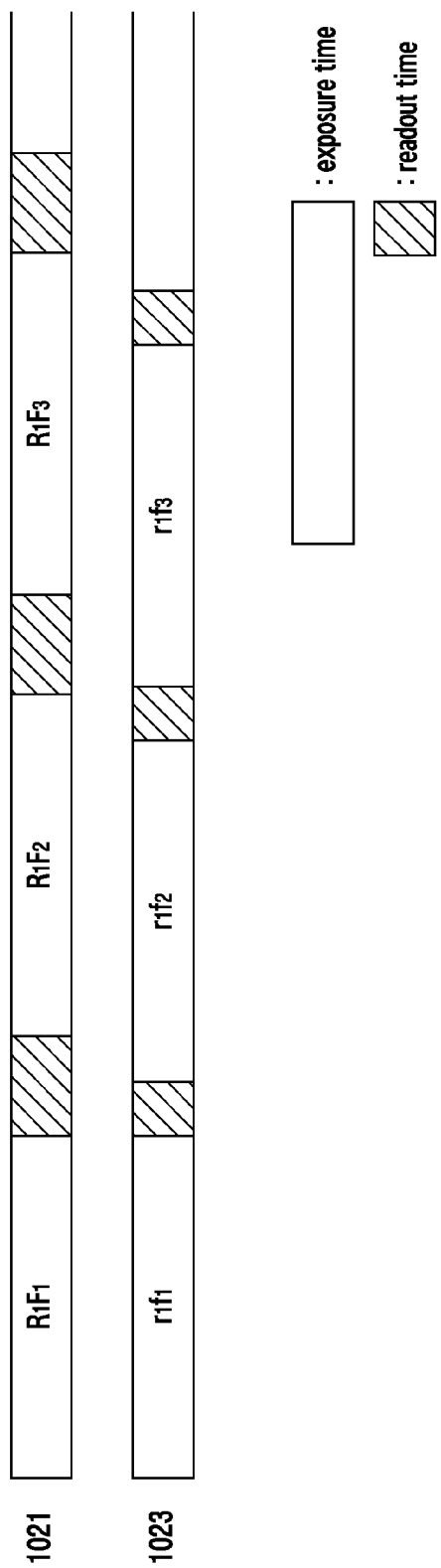

Referring to FIG. 10B, a reference numeral 1021 indicates an example of an operation of the first image sensor 420 according to the RAP1, and a reference numeral 1023 indicates an example of an operation of the second image sensor 430 according to the RAP2. When the row readout times of the first image sensor 420 and the second image sensor 430 are different as illustrated in FIG. 10A, line synchronization of the first image sensor 420 and the second image sensor 430 may fail as illustrated in FIG. 10B.

Figure 10C:
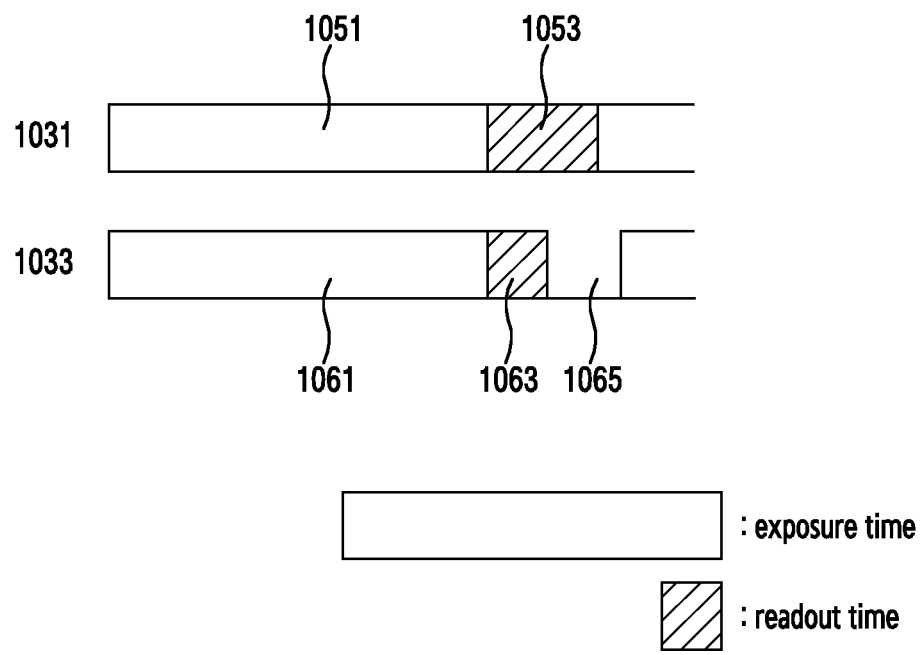

Referring to FIG. 10C, a reference numeral 1031 indicates an example of the RAP1 of the first image sensor 420, and a reference numeral 1033 indicates an example of the RAP2 (synchronized RAP2) of the second image sensor 430 synchronized with the RAP1 of the first image sensor 420. In FIG. 10C, row exposure times 1051 and 1061 of the first image sensor 420 and the second image sensor 430 have the same period. In FIG. 10C, the row readout time 1053 of the first image sensor 420 is different from the row readout time 1063 of the second image sensor 430. The processor 400 adds a blank time 1065 to the row access period of the second image sensor 430 in order to make the row readout time of the second image sensor 430 have the same period as the row readout time 1053 of the first image sensor 420. The row readout time 1063 of the second image sensor 430 becomes the same time as the row readout time of the first image sensor 420 in the synchronized row access period SRAP2 of the second image sensor 430 by adding the blank time 1065 to the row readout time 1063.

Figure 10D:
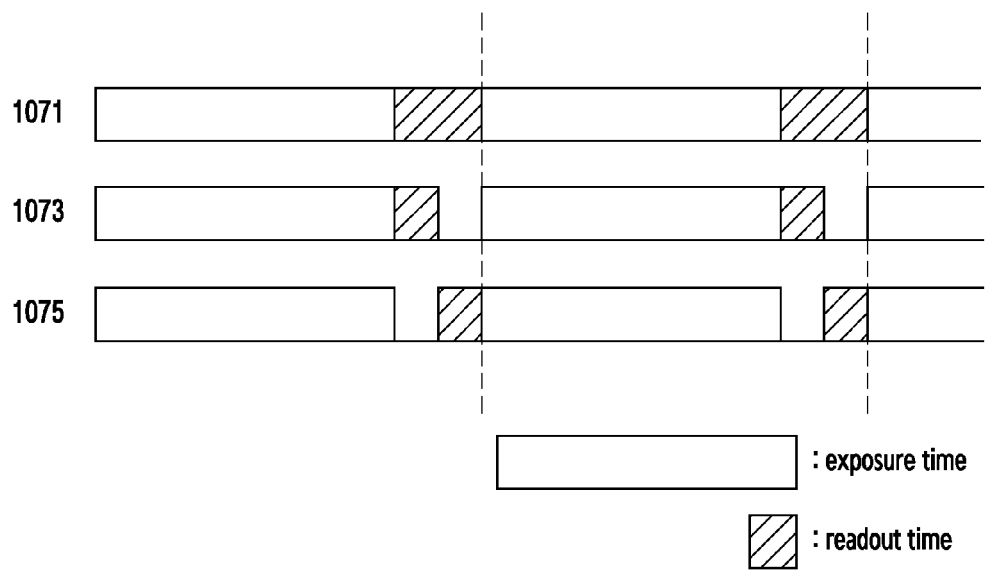

In FIG. 10D, a reference numeral 1071 is the row access period of the first image sensor 420. In FIG. 10D, reference numerals 1073 and 1075 are row access periods of the second image sensor 430 synchronized with the row access period of the first image sensor 420. In FIG. 10D, the reference numeral 1073 indicates an example in which the row exposure time of the second image sensor 430 is synchronized with the row exposure time of the first image sensor 420, the row readout time of the second image sensor 420 is activated after the row exposure time ends, and the second image sensor 430 remains in a blank during the remaining row readout time of the first image sensor 420. In FIG. 10D, the reference numeral 1075 indicates an example in which the row exposure time of the second image sensor 430 is synchronized with the row exposure time of the first image sensor 420, the row readout time of the second image 420 is activated after a blank is maintained for a preset time after the row exposure time ends, and thus, is synchronized with the end of the row readout time of the first image sensor 420. For example, the row exposure time of the second image sensor 430 may be synchronized with the row exposure time of the first image sensor 420, and the row readout time may have a blank time between the end time of the row exposure time and the row readout time.

Figure 10E:
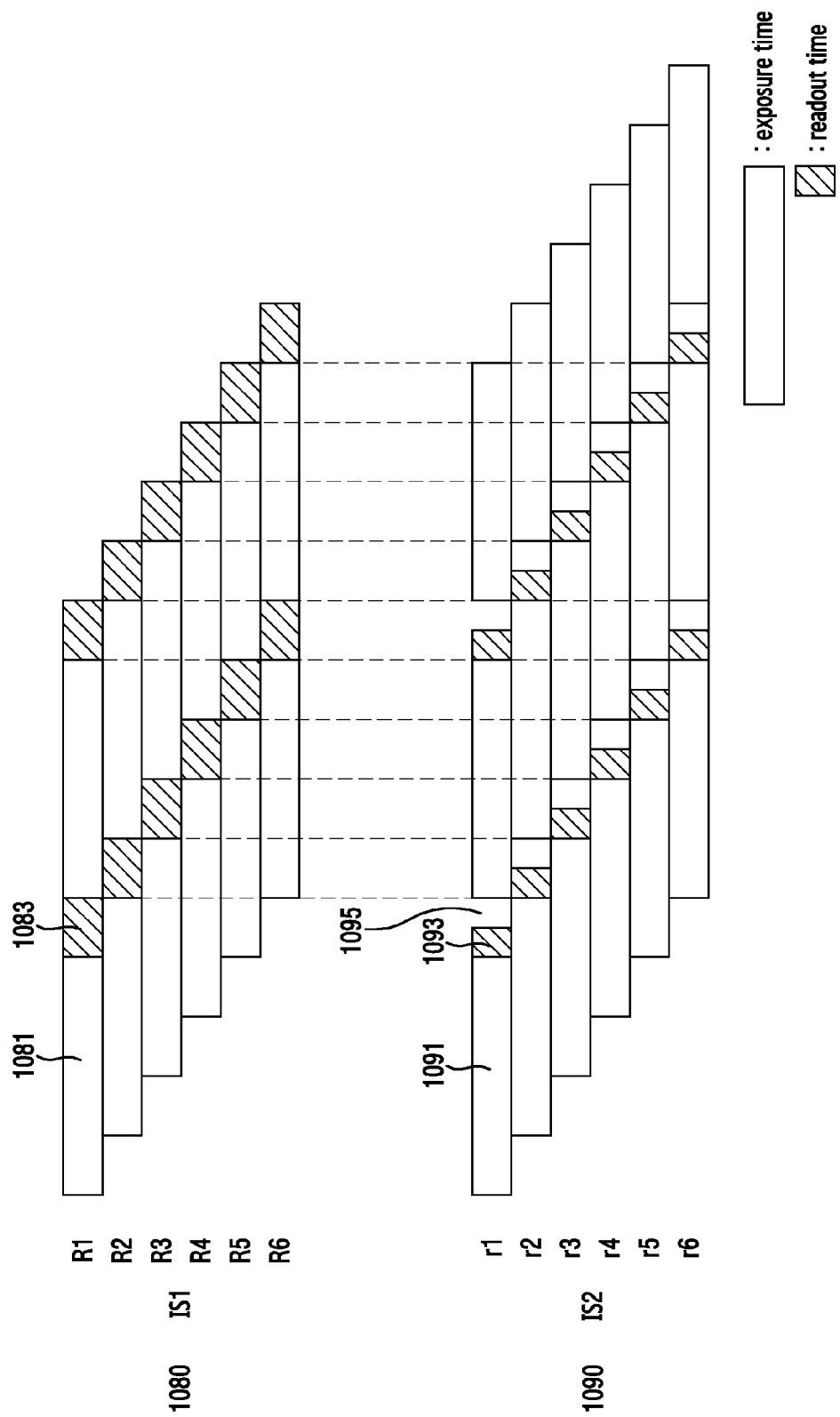

FIG. 10E illustrates an example in which the electronic device including the first image sensor 420 and the second image sensor 430 having different row readout times synchronizes row access periods. The row access period may include a row exposure time and a row readout time. In FIG. 10E, a reference numeral 1080 indicates a row scan operation of the first image sensor 420, and a reference numeral 1090 indicates a row scan operation of the second image sensor 430. In FIG. 10E, row lines of the first image sensor 420 and the second image sensor 430 are synchronized, and the processor 400 may access synchronized row line image data. In FIG. 10E, a row exposure time 1081 of the first image sensor 420 and a row exposure time 1091 of the second image sensor 430 have the same period, and a row readout time 1093 of the second image sensor 430 has a shorter period than that of a row readout time 1083 of the first image sensor 420. The processor 400 may activate the row readout time 1093 of the second image sensor 430 in a row readout time 1083 of the first image sensor 420 and horizontally blanking the remaining time, so as to synchronize the row access periods of the two image sensors.

When it is recognized that the row readout times of the two image sensors are different in operation 911 of FIG. 9, as illustrated in FIG. 10A, the row readout times of the two image sensors can be analyzed, in operation 913. Further, as illustrated in FIG. 10A, when the row readout time of the second image sensor 430 is faster, the row access period of the second image sensor 430 is synchronized with the row access period of the first image sensor 420 by controlling the row readout time of the second image sensor 430 in operation 917, as illustrated in FIG. 10C. Thereafter, the processor 400 controls the operations of the first image sensor 420 and the second image sensor 430 according to the synchronized first access period and second access period, in operation 919.

Secondly, an operation in a case in which the row exposure times of the first image sensor 420 and the second image sensor 430 are different is described in greater detail below.

Figure 11:
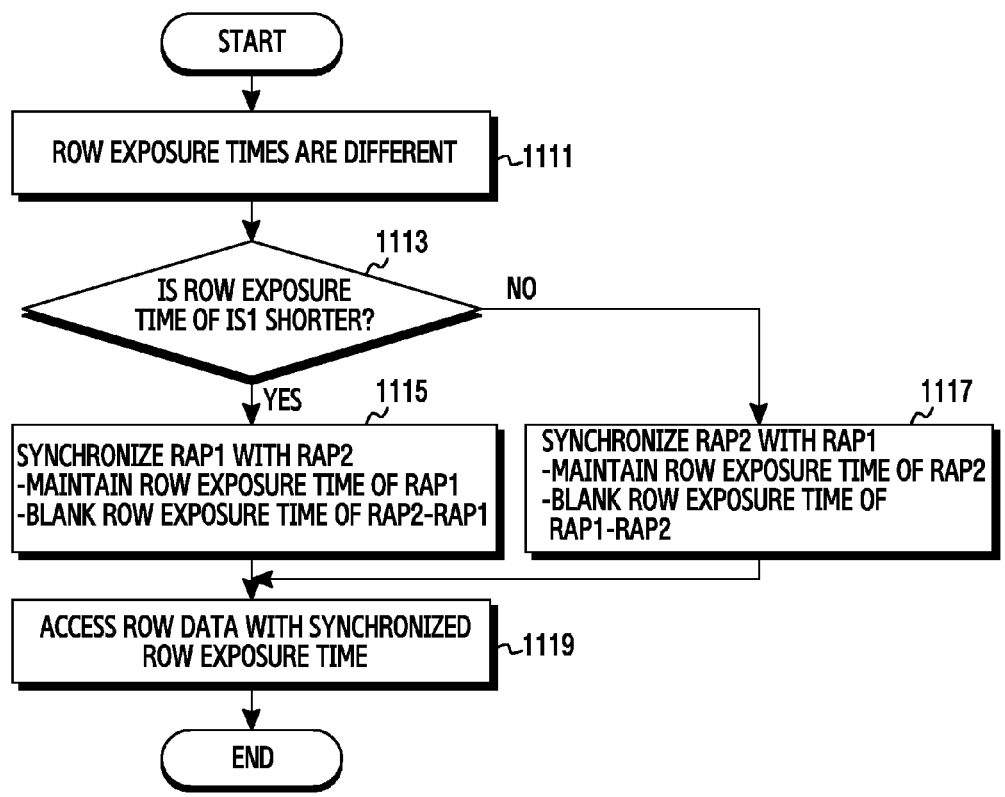
FIG. 11 is a flowchart illustrating a process in which an electronic device synchronizes row access operations of image sensors having different row exposure times, according to an embodiment of the present disclosure.

FIG. 11 is a flowchart illustrating a process in which the electronic device synchronizes row access operations of image sensors having different row exposure times, according to an embodiment of the present disclosure.

Referring to FIG. 11, when the first image sensor 420 and the second image sensor 430 are driven, the processor 400 analyzes operation characteristics of the two image sensors. The operation characteristics may include the row exposure time. The exposure may vary depending on a characteristic of the image sensor or an exposure control by the user. Further, an exposure value may be changed during photographing by an auto exposure control of image sensors. The first image sensor 420 and the second image sensor 430 may perform photographing operations with different exposure times.

When the row exposure times of the first image sensor 420 and the second image sensor 430 are different, the processor 400 recognizes the difference, in operation 1111. When the row exposure times of the two image sensors are different, the processor 400 analyzes the row exposure times of the two image sensors, and determines whether the row exposure time of the first image sensor 410 is shorter, in operation 1113. When the row exposure time of the first image sensor 420 is shorter, the processor 400 synchronizes the RAP1 of the first image sensor 420 with the RAP2 of the second image sensor 430, in operation 1115. The processor 400 may generate the synchronized row access period SRAP1 by blanking the remaining row exposure time interval (interval generated by subtracting RAP1 from RAP2) of the second image sensor 430 while maintaining the row exposure time of the first image sensor 420, in operation 1115. When the row exposure time of the second image sensor 430 is shorter, the processor 400 synchronizes the RAP2 of the second image sensor 430 with the RAP1 of the first image sensor 420, in operation 1115. The processor 400 may generate the synchronized row access period SRAP2 by blanking the remaining row exposure time interval (interval generated by subtracting RAP2 from RAP1) of the first image sensor 420 while maintaining the row exposure time of the second image sensor 430 in operation 1117. After synchronizing the row access periods, the processor 400 controls the first image sensor 420 and the second image sensor 430 according to the synchronized row access periods, in operation 1119.

FIGS. 12A to 12F are diagrams illustrating a method of synchronizing row exposure times of image sensors, according to an embodiment of the present disclosure.

Figure 12A:
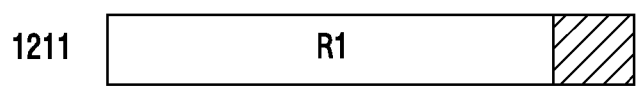
FIGS. 12A to 12F are diagrams illustrating a method of synchronizing row exposure times of image sensors, according to an embodiment of the present disclosure.
Figure 12A:
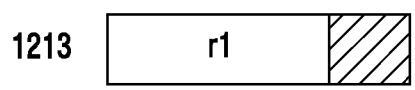
Figure 12A:
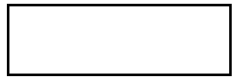
Figure 12A:

Referring to FIG. 12A, a reference numeral 1211 indicates the RAP1 of the first image sensor 420, and a reference numeral 1213 indicates an example of the RAP2 of the second image sensor 430 having a different row exposure time.

Figure 12B:
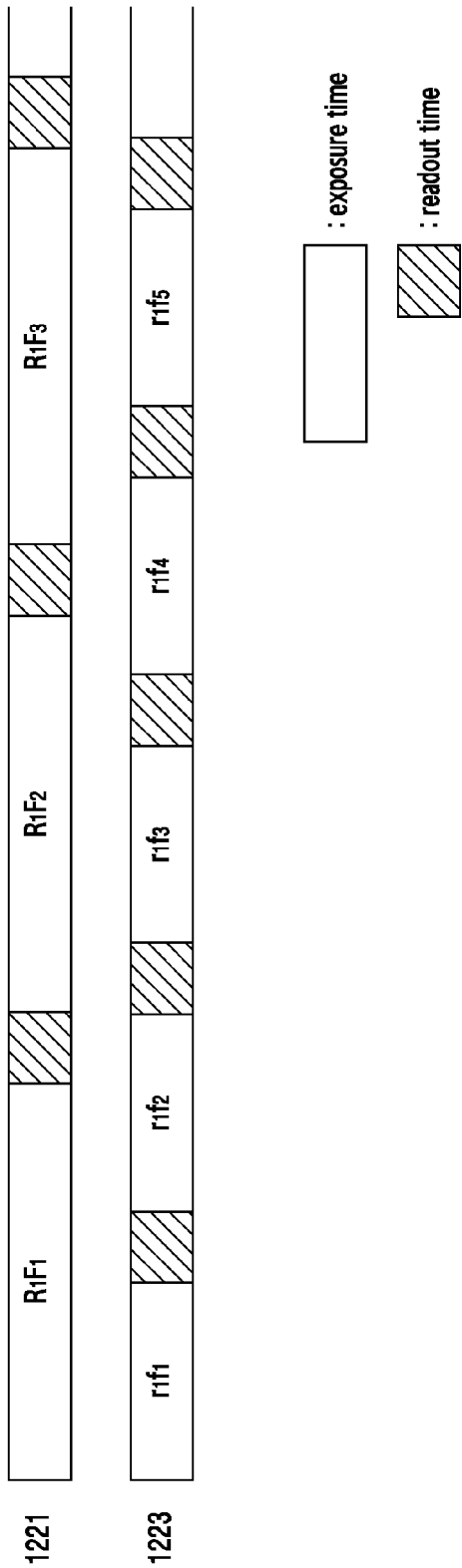

Referring to FIG. 12B, a reference numeral 1221 indicates an example of an operation of the first image sensor 420 according to the RAP1, and a reference numeral 1223 indicates an example of an operation of the second image sensor 430 according to the RAP2. When the row exposure times of the first image sensor 420 and the second image sensor 430 are different, as illustrated in FIG. 12A, line synchronization of the first image sensor 420 and the second image sensor 430 may fail, as illustrated in FIG. 12B.

Figure 12C:
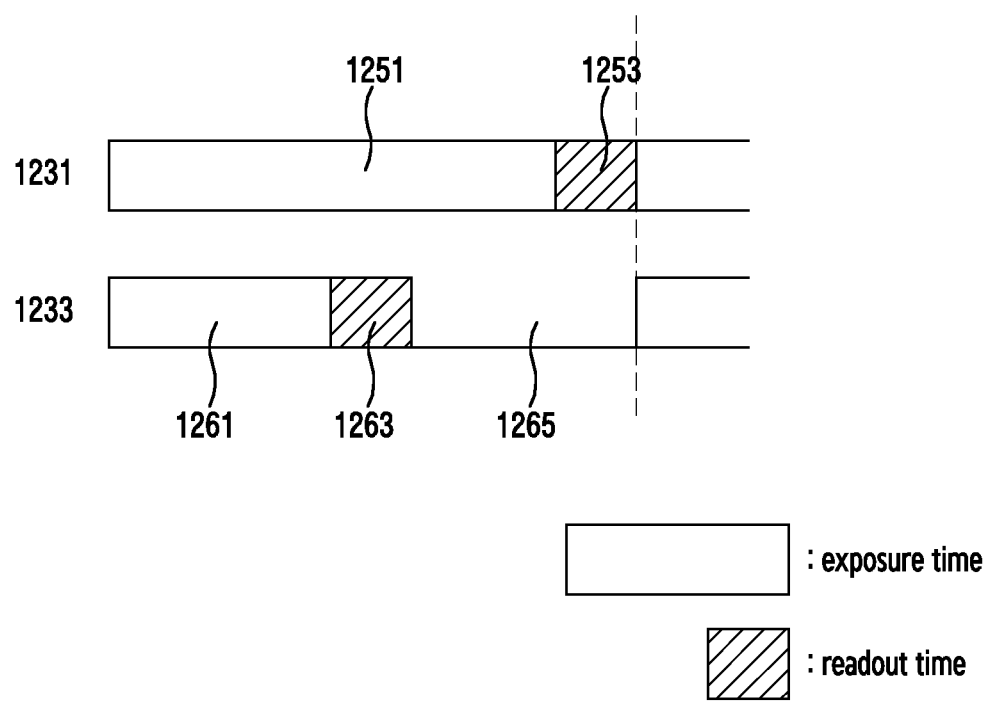

Referring to FIG. 12C, a reference numeral 1231 indicates an example of the RAP1 of the first image sensor 420, and a reference numeral 1233 indicates an example of the RAP2 of the second image sensor 430 synchronized with the row access period of the first image sensor 420. In FIG. 12C, row exposure times 1251 and 1261 of the first image sensor 420 and the second image sensor 430 have different periods. In FIG. 12C, the row exposure time 1251 of the first image sensor 420 is different from the row exposure time 1261 of the second image sensor 430. According to an embodiment, the processor 400 adds a blank time 1265 to the RAP2 of the second image sensor 430 in order to make the row access periods of the first image sensor 420 and the second image sensor 430 the same. The row exposure time 1261 of the second image sensor 430 becomes the same time as the row exposure time of the first image sensor 420 in the synchronized row access period SRAP2 of the second image sensor 430 by adding the blank time 1265 to the row exposure time 1261.

In FIG. 12C, the row exposure times 1251 and 1261 of the first image sensor 420 and the second image sensor 430 have different periods. According to an embodiment, the processor 400 adds the blank time 1265 to the RAP2 of the second image sensor 430 in order to make the row access periods of the first image sensor 420 and the second image sensor 430 the same. A row readout time 1253 of the first image sensor 420 and a row readout time 1263 of the second image sensor 430 may have the same period.

Figure 12D:
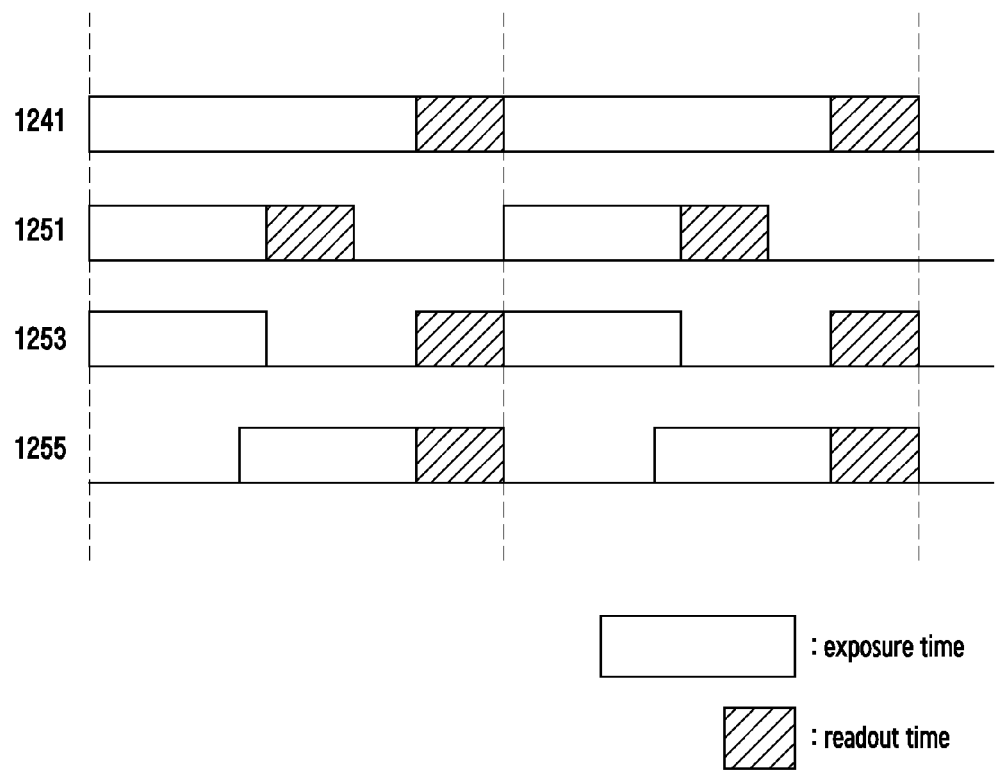

In FIG. 12D, a reference numeral 1241 is the row access period of the first image sensor 420. In FIG. 12D, reference numerals 1251, 1253, and 1255 are the row access periods of the second image sensor 430 synchronized with the row access period of the first image sensor 420. In FIG. 12D, the reference numeral 1251 indicates an example in which a start time of the row exposure time of the second image sensor 430 is synchronized with a start time of the row exposure time of the first image sensor 420, and the row readout time is activated at an end time of the row exposure time of the second image sensor 430 and remains in a blank before the next row exposure time is activated. In FIG. 12D, the reference numeral 1253 indicates an example in which a start time of the row exposure time of the second image sensor 430 is synchronized with a start time of the row exposure time of the first image sensor 420, the row readout time is synchronized with the row readout time of the first image sensor 420, and an interval after an end time of the row exposure time of the second image sensor 430 before the row readout time is activated is blanked. In FIG. 12D, the reference numeral 1255 indicates an example in which a blank exists during a time (generated by subtracting the exposure period RAP2 from exposure period RAP1) from a row exposure start time of the first image sensor 420, a row exposure time of the second image sensor 430 is activated from an end time of the blank interval, and a row readout time of the second image sensor 430 is synchronized with the row readout time of the first image sensor 420.

Figure 12E:
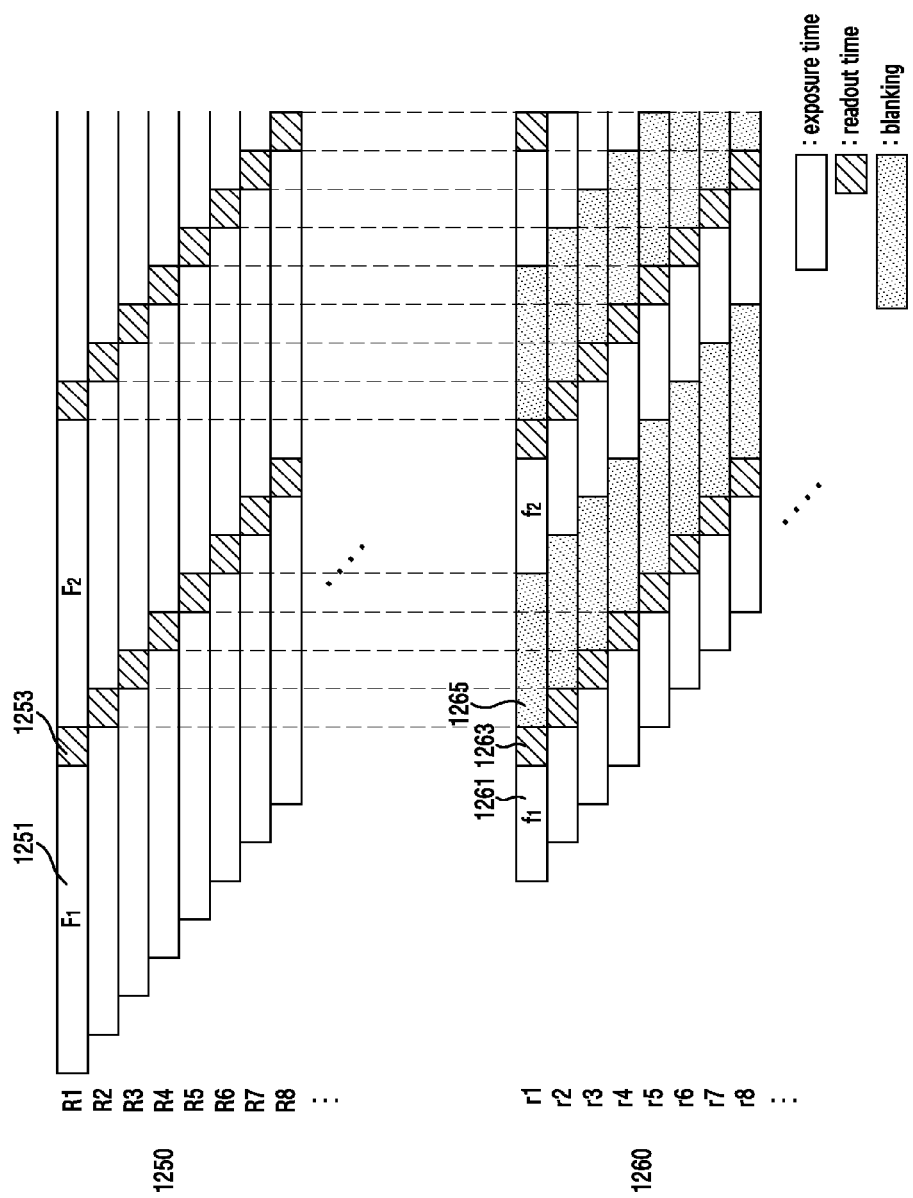

FIG. 12E illustrates an example in which the electronic device including the first image sensor 420 and the second image sensor 430 having different row exposure times synchronizes row access periods. The row access period may include a row exposure time and a row readout time. In FIG. 12E, a reference numeral 1250 indicates a row scan operation of the first image sensor 420 and a reference numeral 1260 indicates a row scan operation of the second image sensor 430. In FIG. 12E, an access period of row lines of the first image sensor 420 and the second image sensor 430 are synchronized, and the processor 400 may access line-synchronized image data. In FIG. 12E, a row exposure time 1251 of the first image sensor 420 may have a larger period than that of a row exposure time 1261 of the second image sensor 430, and a row readout time 1253 of the first image sensor 420 and a row readout time 1263 of the second image sensor 430 may have the same period. The processor 400 may activate the row exposure time 1261 of the second image sensor 430 in a partial interval of the row exposure time 1251 of the first image sensor 420 and horizontally blank the row access period of the second image sensor 430 in the remaining row exposure time of the first image sensor 420, as indicated by a reference numeral 1265, so as to synchronize the row access periods of the two image sensors.

Figure 12F:
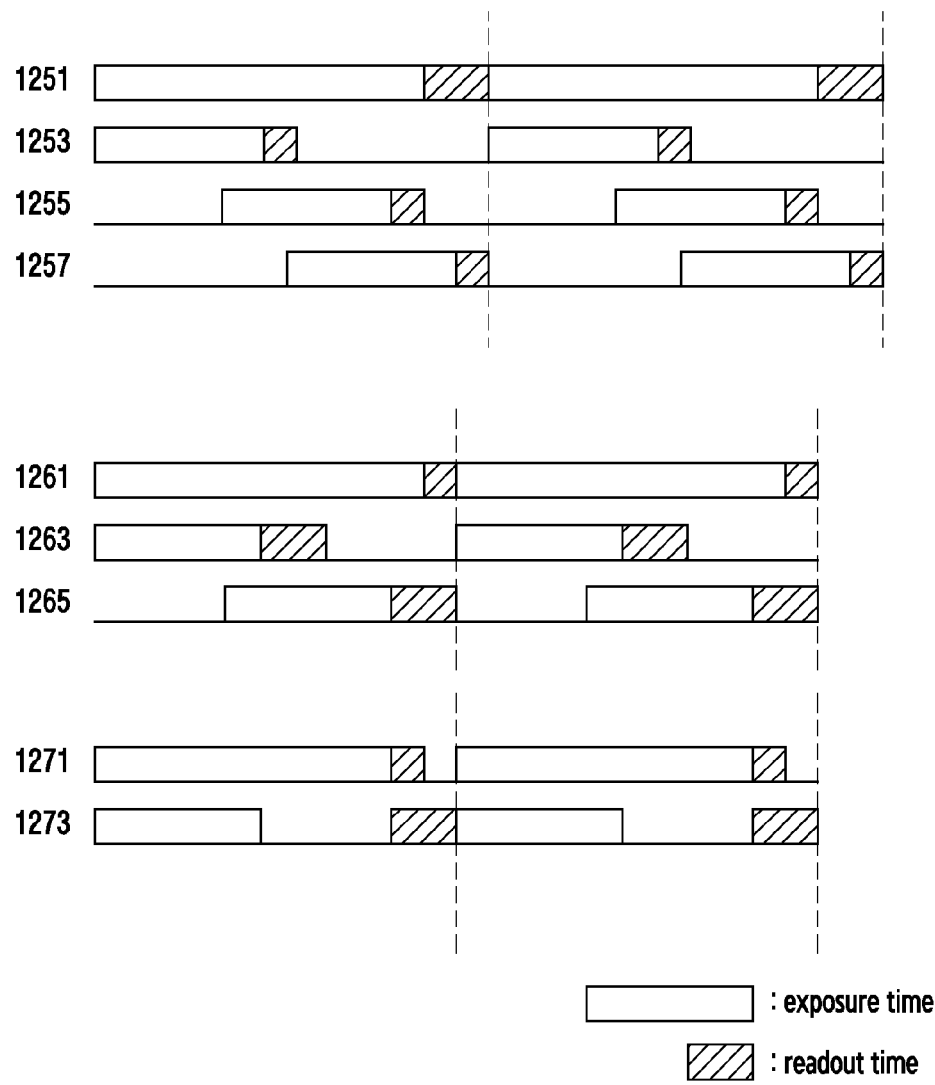

FIG. 12F illustrates another example in which row exposure times and row readout times of the first image sensor 420 and the second image sensor 430 are all different. The row exposure time and the row readout time of the first image sensor 420 are indicated by the reference numeral 1251, and both the row exposure time and the row readout time of the second image sensor 430 may have a shorter period than that of the row exposure time and the row readout time of the first image sensor 420. In this case, the processor 400 synchronizes the row exposure time and the row readout time of the second image sensor 430 as indicated by the reference numeral 1253, 1255, or 1257. As illustrated in FIG. 12F, when the row exposure time and the row readout time of the first image sensor 420 and the row exposure time and the row readout time of the second image sensor 430 are different, activation times of the row exposure time and the row readout time may be synchronized to make the row access periods the same. For example, an exposure start of the first image sensor 420 may match an exposure start of the second image sensor 430 based on the exposure time 1251 of the first image sensor 420, an exposure center of the first image sensor 420 may match an exposure center of the second image sensor 430, or an exposure end of the first image sensor 420 may match an exposure end of the second image sensor 430.

The row exposure time and the row readout time of the first image sensor 420 is indicated by a reference numeral 1261, the row exposure time of the second image sensor 430 is shorter than the row exposure time of the first image sensor 420, and the row readout time of the second image sensor 430 is longer than the row readout time of the first image sensor 420. In this case, the processor 400 may synchronize the row access period of the second image sensor 430 with the row access period of the first image sensor 420 as indicated by a reference numeral 1263 or 1265.

Further, when the row exposure time of the first image sensor 420 (or the second image sensor 430) is longer than the row exposure time of the second image sensor 430 (or the first image sensor 420) but the row readout time of the first image sensor 420 (or the second image sensor 430) is shorter than the row readout time of the second image sensor 430 (or the first image sensor 420), the row access periods may be synchronized in a method indicated by reference numerals 1271 and 1273. In this case, the row exposure time of the second image sensor 430 may match a row exposure start time or a row exposure center time of the first image sensor 420 and the remaining exposure time period may be blanked. The row readout time of the first image sensor 420 may be synchronized with a start time or a center time of the second image sensor 430 and the remaining readout time period may be blanked.

Thirdly, an operation in a case where the resolutions of the first image sensor 420 and the second image sensor 430 are different is described in greater detail below. The resolution may be determined by the number of row lines and column lines of the image sensor. The following described will be made based on the row lines.

Figure 13A:
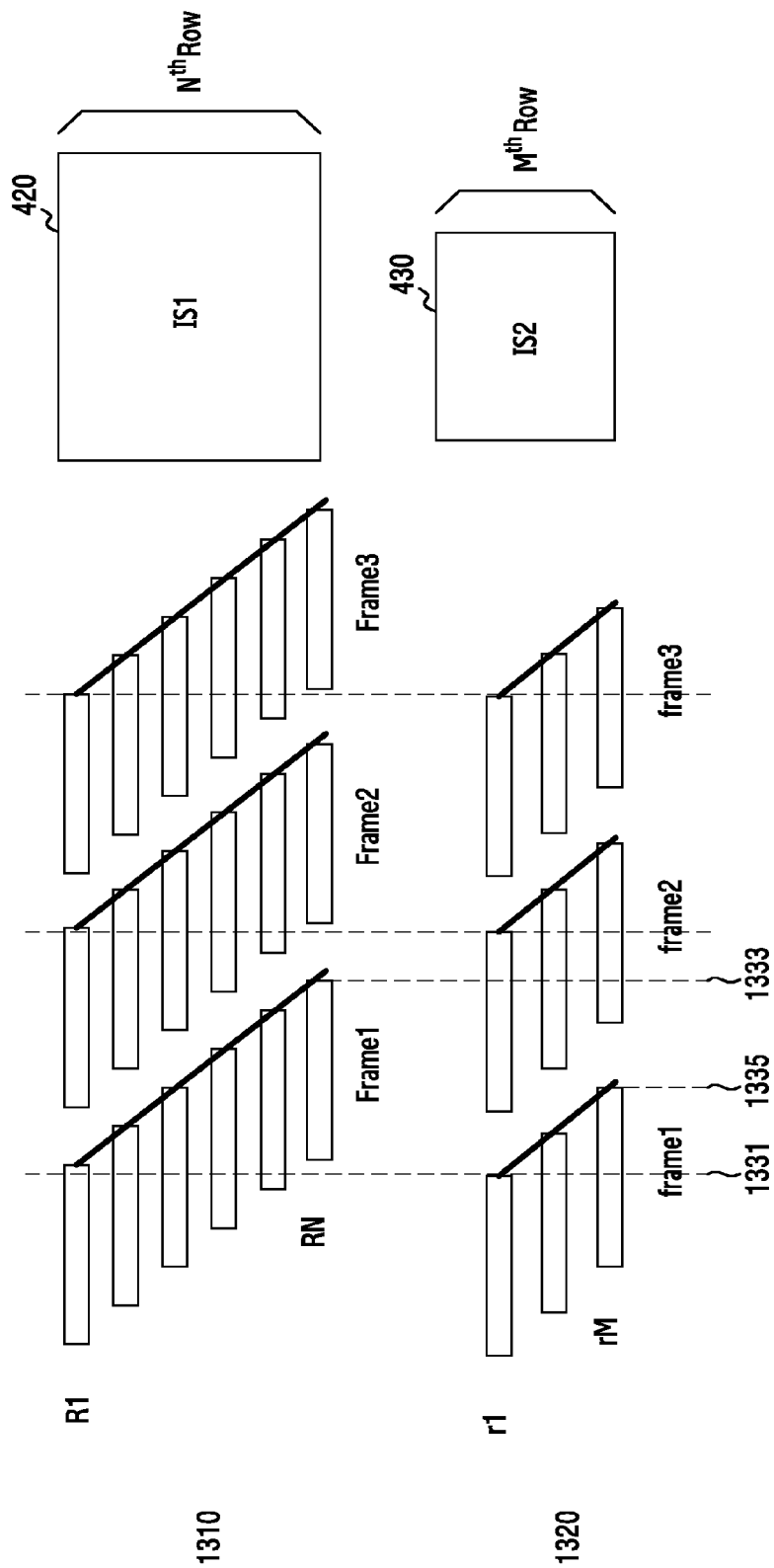
FIGS. 13A and 13B are diagrams illustrating a method by which an electronic device accesses images of image sensors having different resolutions, according to an embodiment of the present disclosure.
Figure 13B:
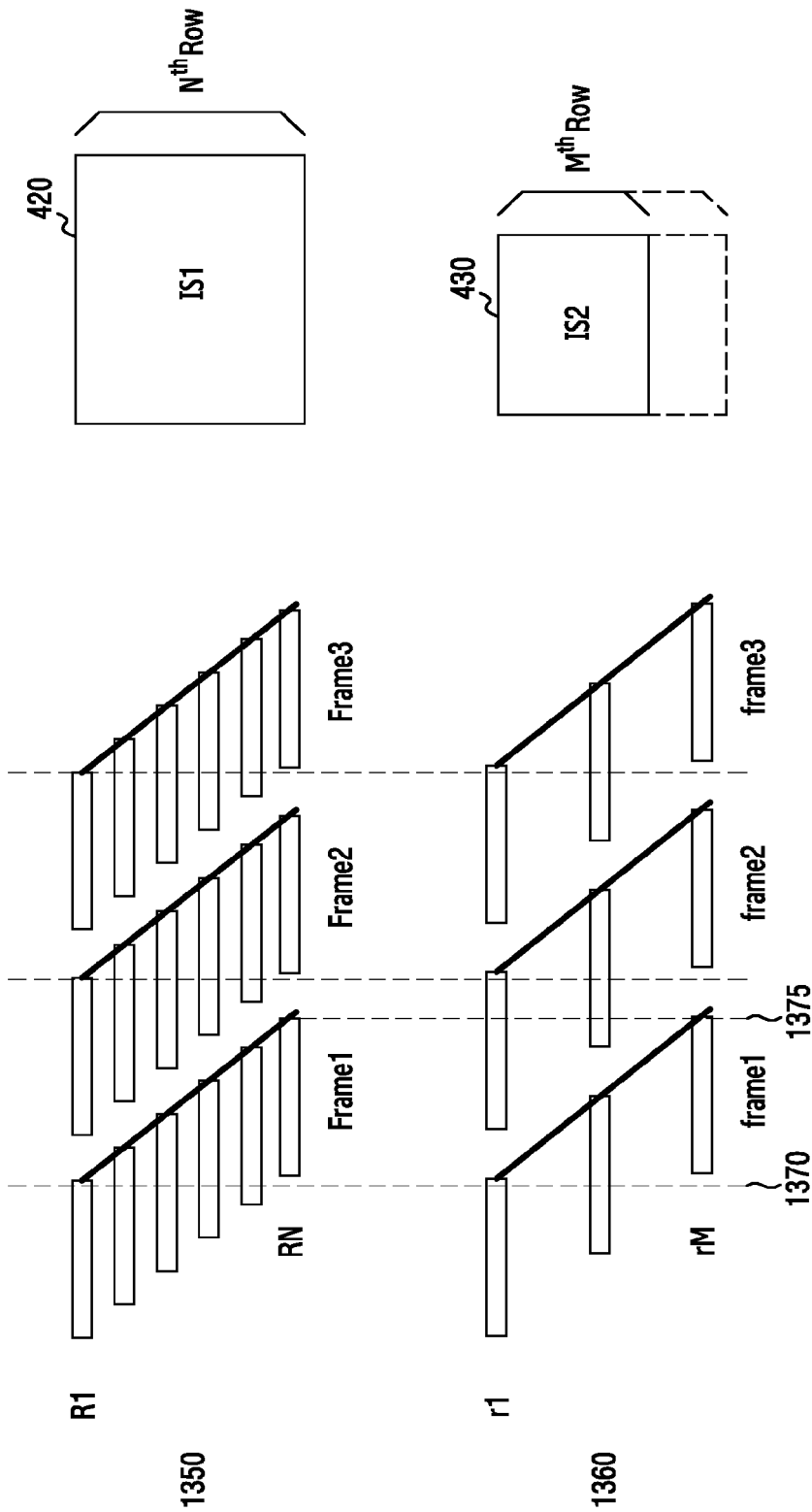

FIGS. 13A and 13B are diagrams illustrating a method by which the electronic device accesses images of image sensors having different resolutions, according to an embodiment of the present disclosure.

Referring to FIG. 13A, the first image sensor 420 includes a pixel array of N row lines and the second image sensor 430 includes a pixel array of M row lines.

A reference numeral 1310 indicates a row line access of the first image sensor 420, and a reference numeral 1320 indicates a row line access of the second image sensor 430 having M row lines. The first image sensor 420 and the second image sensor 430 may be controlled according to the same row access period. When N is larger than M, the resolution of the first image sensor 420 may be higher than the resolution of the second image sensor 430. In other words, the number of row lines of the first image sensor 420 may be larger than the number of row lines of the second image sensor 430.

When the resolutions of the image sensors are different, frame synchronization may fail even though the image sensors have the same row access period. For example, when N is two times larger than M and line data of the first image sensor 420 and the second image sensor 430 are accessed according to the same row access period, the first image sensor 420 may access $M^{th}$ line data (for example, line data at a location of ½ of the first image sensor 420) at a time point when the second image sensor 430 accesses last line data RM as indicated by a reference numeral 1335. Further, when the first image sensor 420 accesses last $N^{th}$ line data, the second image sensor 430 may access line data of the next frame. When the row line data is accessed as illustrated in FIG. 13A, the processor 400 may access row line image data having no correlation.

When the image sensors have different resolutions (when first image sensor Row#=N and second image sensor Row#=M, N>M), there may be a difference between readout times of all row line data of the image sensors even though the row access periods are the same (even though a readout speed of each row line is the same). When images are acquired by simultaneously driving the first image sensor 420 and the second image sensor 430, the acquired two images may have a correlation therebetween. However, if the resolutions of the two image sensors are different, images accessed at the same time point when row line images are accessed may not be row line images having a correlation therebetween as illustrated in FIG. 13A. The processor 400 may analyze a row line ratio of the first image sensor 420 and the second image sensor 430 and activate the row access period of the image sensor having the higher resolution in consideration of the row access period of the image sensor having the lower resolution. The processor 400 may analyze a resolution ratio of the first image sensor 420 and the second image sensor 430 and synchronize the row access periods at the time for the corresponding row line (row line corresponding to the same image area in the image) of each image sensor.

Referring to FIG. 13B, when the resolutions of the first image sensor 420 and the second image sensor 430 are different, the processor 400 may synchronize the row access period of the image sensor having the lower resolution with the row access period of the image sensor having the higher resolution. For example, when the resolution of the first image sensor 420 includes N row lines, the resolution of the second image sensor 430 includes M row lines, and N=2M, the processor 400 may increase the row access period of the second image sensor 430 to twice the row access period of the first image sensor 420 and access corresponding line images. For example, accessing a first line image of the second image sensor 430, the processor 400 may control the row access period to access second line images of the first image sensor 420. At this time, line images accessed by the first image sensor 420 and the second image sensor 430 may be images of the same subject. Then, the processor 400 may access corresponding line data in the first image sensor 420 and the second image sensor 430 according to the same row access period, as indicated by reference numerals 1370 and 1375 of FIG. 13B.

Figure 14:
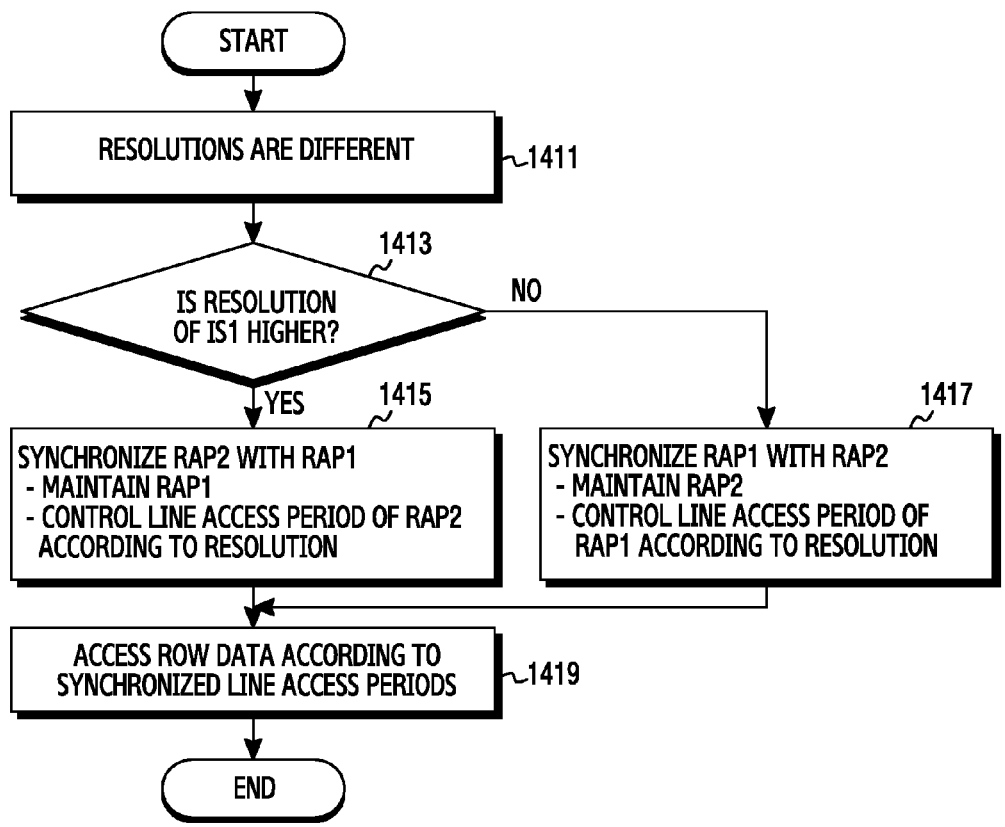
FIG. 14 is a flowchart illustrating a process in which an electronic device synchronizes row access operations of image sensors having different resolutions, according to an embodiment of the present disclosure.

FIG. 14 is a flowchart illustrating a process in which the electronic device synchronizes row access operations of image sensors having different resolutions, according to an embodiment of the present disclosure.

Referring to FIG. 14, when the first image sensor 420 and the second image sensor 430 are driven, the processor 400 may analyze operation characteristics of the two image sensors. The operation characteristics may include a difference between the resolutions of the image sensors. The resolution difference may mean that the image sensors have the different numbers of row lines. When the resolutions of the first image sensor 420 and the second image sensor 430 are different, the processor 400 recognizes the difference, in operation 1411. When the resolutions of the two image sensors are different, the processor 400 analyzes the resolutions of the two image sensors, and determines whether the resolution of the first image sensor 420 is higher, in operation 1413.

When the resolution of the first image sensor 420 is higher, the processor 400 maintains the RAP1 of the first image sensor 420 and synchronizes the RAP2 of the second image sensor 430 with the RAP1 of the first image sensor 420 according to a resolution ratio, in operation 1415. For example, when the number of row lines of the first image sensor 420 is twice the number of the row lines of the second image sensor 430, the processor 400 may activate the row access period of the second image sensor 430 in accordance with a period corresponding to two times of the row access period of the first image sensor 420, in operation 1415. When the resolution of the second image sensor 430 is higher, the processor 400 maintains the RAP2 of the second image sensor 430 and synchronizes the RAP1 of the first image sensor 420 with the RAP2 of the second image sensor 430, in operation 1417. For example, when the number of row lines of the second image sensor 430 is quadruple the number of the row lines of the first image sensor 420, the processor 400 may activate the row access period of the first image sensor 420 in accordance with a period corresponding to four times of the row access period of the second image sensor 430, in operation 1417.

After synchronizing the row access periods, the processor 400 accesses row line data of the first image sensor 420 and the second image sensor 430 according to the corresponding synchronized access periods, in operation 1419. For example, the processor 400 may access the row line data of the image sensor having the higher resolution according to the originally set row access period and access the corresponding row line data of the image sensor having the lower resolution according to the synchronized row access period.

Figure 15A:
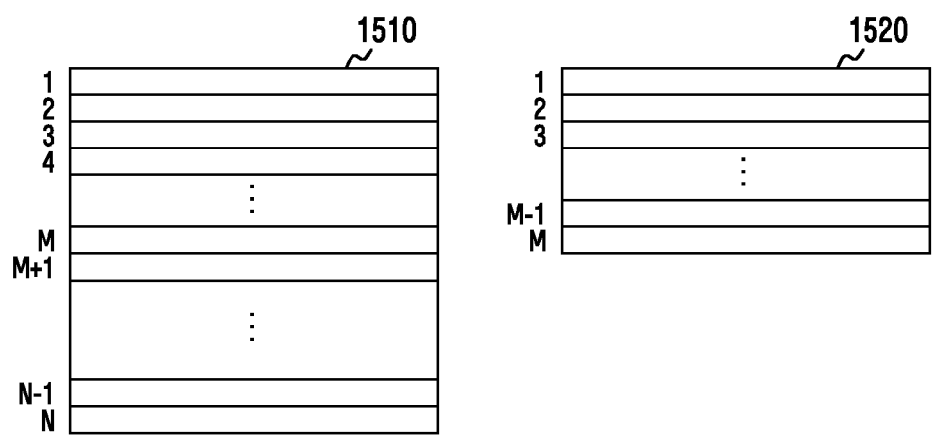
FIGS. 15A to 15C are diagrams illustrating a method of synchronizing row access periods of image sensors having different resolutions, according to an embodiment of the present disclosure.
Figure 15B:
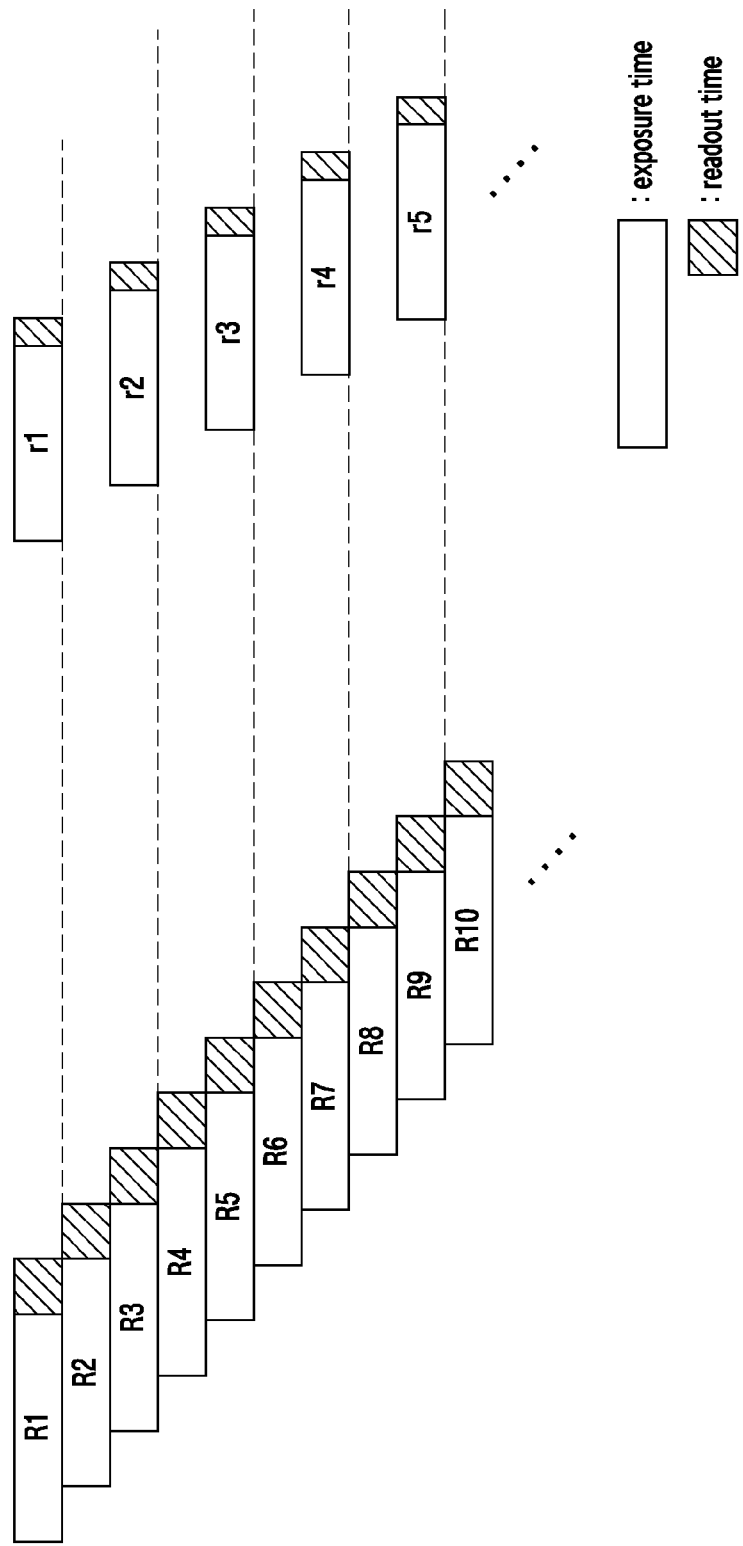
Figure 15C:
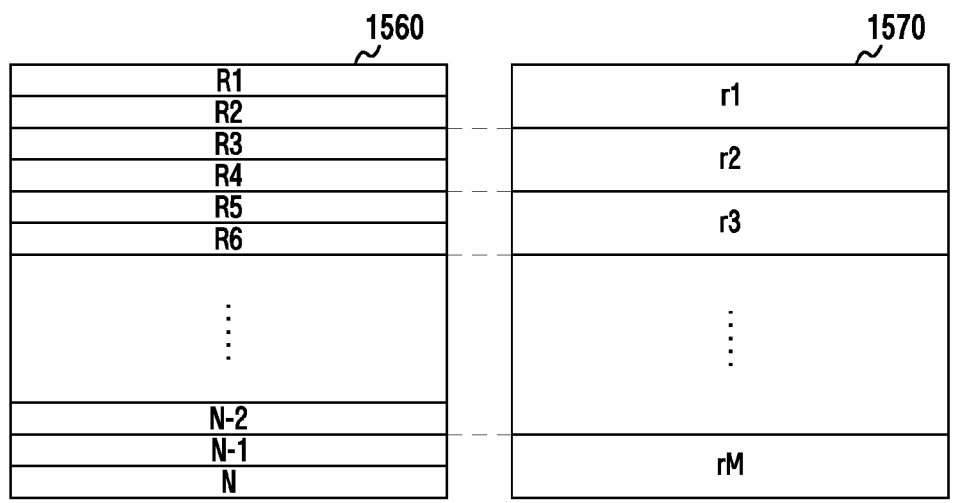

FIGS. 15A to 15C are diagrams illustrating a method of synchronizing row access periods of image sensors having different resolutions, according to an embodiment of the present disclosure.

In FIG. 15A, a reference numeral 1510 indicates an example of the first image sensor 420 having N row lines, and a reference numeral 1520 indicates an example of the second image sensor 430 having M row lines, M being smaller than N.

FIG. 15B illustrates an example in which the processor 400 controls row accesses of the image sensors when N=2M. The first image sensor 420 and the second image sensor 430 may have different resolutions and sense images at the same view angle. For example, the first image sensor 420 and the second image sensor 430 may sense images of the same subject but resolutions (for example, the number of pixels) of the images may be different. When N=2M, the second image sensor 430 may generate corresponding row line data in every two row access periods of the first image sensor 420. Accordingly, the processor 400 may maintain the row access period of the first image sensor 420 and control the row access period of the second image sensor 430 to make one access in every two row line intervals of the second image sensor 430, as illustrated in FIG. 15B. When the row access periods of the first image sensor 420 and the second image sensor 430 are synchronized as illustrated in FIG. 15B, the processor 400 may access one piece of row line data of the second image sensor 430 when accessing two pieces of row line data of the first image sensor 420, as illustrated in FIG. 15C. For example, when the first image sensor has the resolution of N row lines, the second image sensor has the resolution of M row lines, and N>M, the processor may synchronize the row access periods by blanking the row access period of the second image sensor, such that the row access period of the second image sensor becomes N/M times of the row access period.

When accessing row line data of image sensors having different resolutions, the processor 400 may access corresponding row line data as illustrated in FIG. 15C. In FIG. 15C, a reference numeral 1560 indicates an example of accessing row line data of the first image sensor 420, and a reference numeral 1570 indicates an example of accessing row line data of the second image sensor 430.

Referring to FIG. 14, when resolutions of the first image sensor 420 and the second image sensor 430 are different, as illustrated in FIG. 15A, the processor 400 recognizes this difference, in operation 1411. When the resolutions are different, the processor 400 analyzes the resolution difference, and determines whether the resolution of the first image sensor 420 is higher, in operation 1413. When the resolution of the first image sensor 420 is higher, the processor 400 synchronizes the row access period of the second image sensor 430 with the row access period of the first image sensor 420 according to a resolution ratio, in operation 1415, as illustrated in FIG. 15B. When the resolution of the second image sensor 430 is higher, the processor 400 synchronizes the row access period of the first image sensor 420 with the row access period of the second image sensor 430 according to the resolution ratio, in operation 1417. After synchronizing the row access periods, the processor 400 accesses row line data of the first image sensor 420 and the second image sensor 430 according to the synchronized row access periods, in operation 1419, as illustrated in FIG. 15C.

Fourthly, a row line access operation that occurs when the first image sensor 420 and the second image sensor 430 operate in different operation modes is described in greater detail below. The operation mode may be an operation of a sub resolution mode including a binning mode.

When the resolution of the image sensor becomes higher, data that should be processed becomes larger. A technology for binning data of several pixels into one data is used. For example, when the resolution of the image sensor is high in a video mode, it is difficult to maintain a frame rate and power consumption may increase. In this case, a binning method of processing adjacent pixels into one pixel may be used.

The image sensor that acquires depth data may receive light reflected from an object. In order to acquire depth data, an amount of electrons transferred to a float diffusion node included in pixels of the image sensor may be measured and a depth image may be determined using the measured amount of electrons. At this time, when the pixel size is small or when an intensity of the reflected light is weak due to a long distance between the object and the sensor, the depth image may become darker, and thus, a degree of precision of the depth image may deteriorate. In order to improve the degree of precision of the depth image under a condition where the intensity of the reflected light is weak, a binning method may be used.

The first image sensor 420 and/or the second image sensor 430 may operate in the binning mode. Further, the first image sensor 420 and the second image sensor 430 may be image sensors having the same resolution. An example where the second image sensor 430 executes the binning mode is described in greater detail below.

Figure 16:
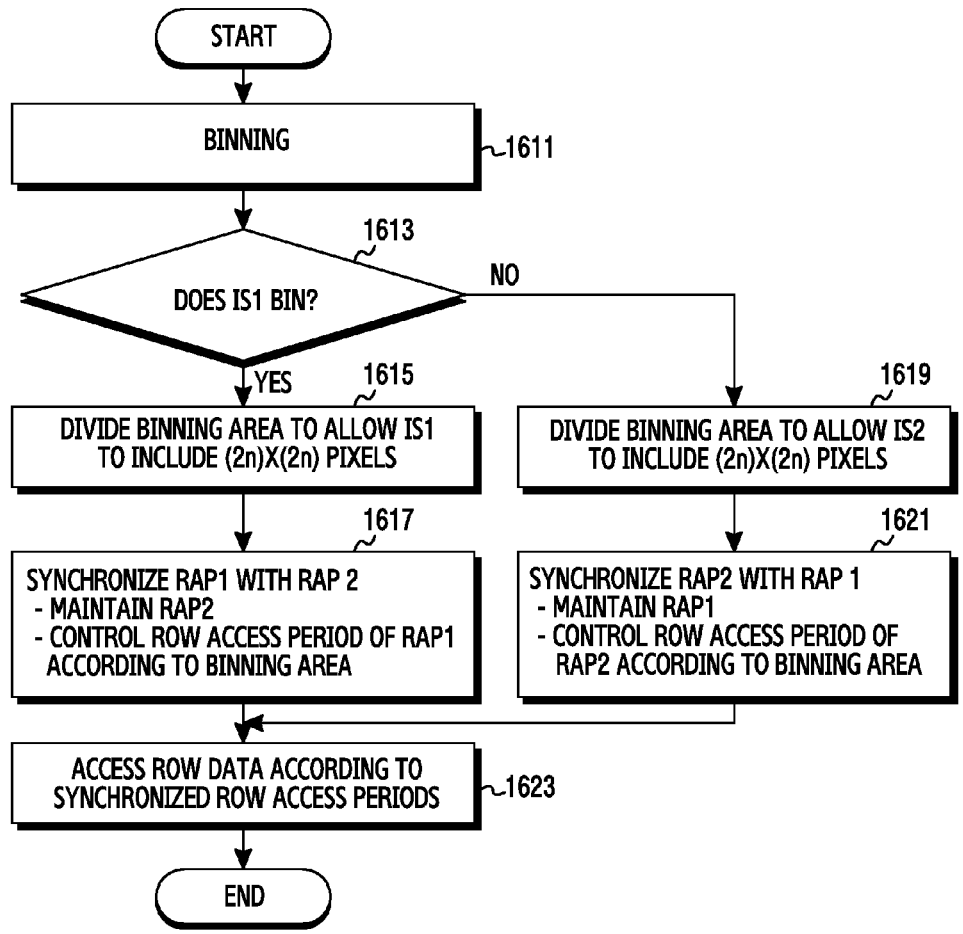
FIG. 16 is a flowchart illustrating a process in which an electronic device including an image sensor that executes a binning mode synchronizes row access operations, according to an embodiment of the present disclosure.

FIG. 16 is a flowchart illustrating a process in which the electronic device including an image sensor that executes a binning mode synchronizes row access operations, according to an embodiment of the present disclosure.

Referring to FIG. 16, the second pixel array 635 of FIG. 6 may have a pixel structure of a Bayer pattern. A binning operation of the pixel may bin adjacent pixels of the same color. For example, when a binning area is set as a 2*2 pixel area, the binning area may include four R pixels, four B pixels, and eight G pixels.

The second image sensor 430 may execute a normal mode and the binning mode. The second row driver 625 of the second image sensor 430 in FIG. 6 may select one row line in the normal mode and select a plurality of row lines according to the binning area in the binning mode. For example, when the binning area corresponds to 2*2, the first row driver 620 of FIG. 6 may select two row lines. For example, the second row driver 625 may first select two odd lines (for example, row lines where R and G pixels are located) and then select two even lines (for example, row lines where G and B pixel are located).

The second image sensor 430 that executes the binning operation may further include a column circuit for reading out binning pixels output to the column lines of the second pixel array 635. The column circuit of the image sensor may serve to read each column line in the binning mode and read out a binning signal by sharing electric charges of binned column lines according to a binning area. Further, the column circuit may output data from each pixel by reading out electric charges of each column line in the normal mode.

Referring to FIG. 16, when driving the first image sensor 420 and the second image sensor 430, the processor 400 may analyze operation characteristics of the two image sensors. The operation characteristics may include whether the image sensor executes the binning mode. When at least one of the first image sensor 420 and the second image sensor 430 is set in the binning mode, the processor 400 recognizes it, in operation 1611. The processor 400 recognizes the image sensor set in the binning mode, and determines whether the first image sensor 420 is set in the binning mode, in operation 1613.

When the first image sensor 420 is set in the binning mode, the processor 400 sets a binning area, in operation 1615. The processor 400 may divide the first pixel array 630 into a plurality of binning areas including 2n*2n (n is an integer larger than or equal to 2) pixels. After dividing the pixel array into the plurality of binning areas, the processor 400 may maintain the RAP2 of the second image sensor 430 and synchronize the RAP1 of the first image sensor 420 that performs a binning operation with the RAP2 of the second image sensor 430 according to the divided binning areas, in operation 1617. The RAP1 may be set such that pixels having the same color are selected from at least two row lines for each of the plurality of divided binning areas.

When the second image sensor 430 is set in the binning mode, the processor 400 sets a binning area, in operation 1619. A method setting the binning area may be performed in the same way as described in operation 1615. After dividing the pixel array into the plurality of binning areas, the processor 400 may set the row access periods of the first image sensor 420 and the second image sensor 430, in operation 1621. The row access periods of the image sensors may be set through a method similar to that of operation 1617.

After setting the row access periods of the first image sensor 420 and the second sensor 430, the processor 400 accesses row line data of the first image sensor 420 and the second sensor 430 by using the synchronized RAP1 and RAP2, in operation 1623. The image sensor set in the binning mode may generate pixel data based on pixel data corresponding to each pixel selected in the column circuit. For example, when the second image sensor 430 performs the binning operation in the 2*2 binning area, the processor 400 may first select first and third row lines at the same time to activate the row exposure time and, when the row exposure time ends, activate the row readout time. When the row readout time is activated, the column circuit of the second pixel array 635 which is not illustrated may share electric charges accumulated in pixels of the same color in the binning area and read out the electric charges to one column line.

For example, when the first image sensor 420 operates in the normal mode and the second image sensor 430 operates in the binning mode, the processor 400 may analyze the binning area of the second image sensor 430 and synchronize the row access period of the second image sensor 430 to match the binning pixels with the corresponding row lines of the first image sensor 420. For example, the binning area may be (2n)*(2m), and n=m or n≠m. When n and m are integers larger than or equal to 2, the processor 400 may synchronize the row access period of the second image sensor 430 such that two row accesses are made in 2n row access periods of the first image sensor 420.

Figure 17B:
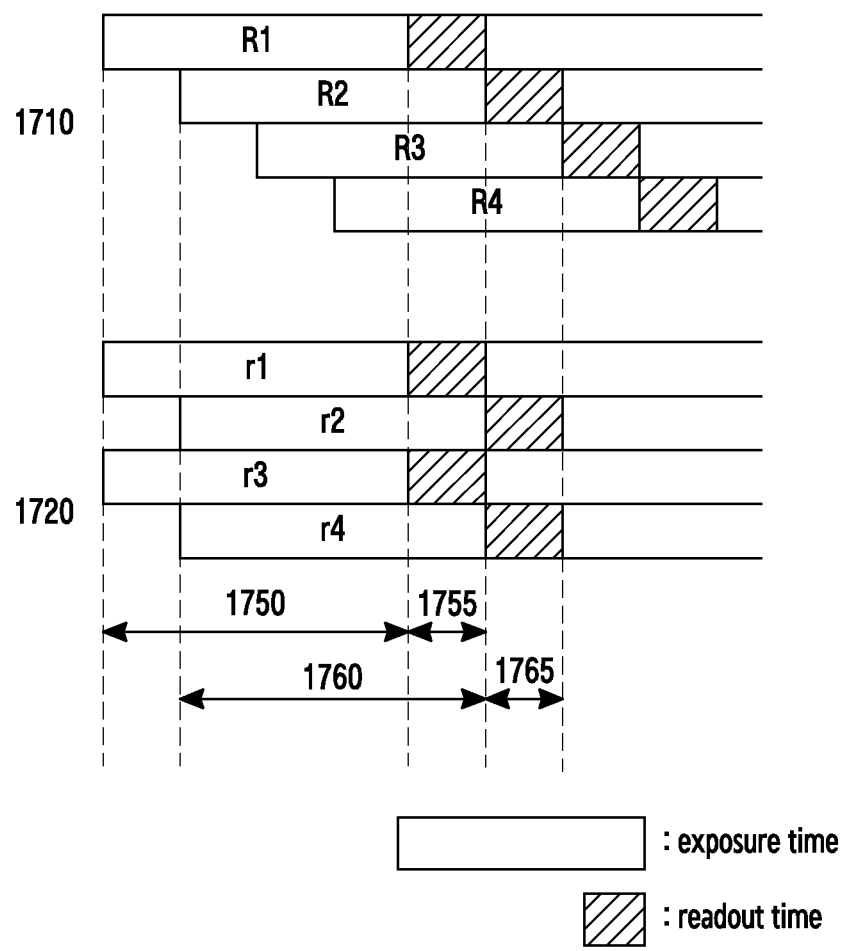

FIGS. 17A to 17C are diagrams illustrating an operation of the image sensor that executes the binning mode, according to an embodiment of the present disclosure.

FIG. 17A illustrates a part of the pixel array included in the image sensor executing the binning mode.

The pixel array may have a Bayer pattern in which a row on which a blue pixel (B) and a green pixel (G) are sequentially arranged and a row on which a green pixel (G) and a red pixel (R) are sequentially arranged are alternately arranged.

In a binning method of the image sensor, the pixel array may be divided into a plurality of binning areas (BAs) in a square shape including (2n)*(2m)(n=m or n≠m, and n and m are integers larger than or equal to 2) pixels. FIG. 17A illustrates an example where the plurality of BAs include 4*4 pixels (that is, n is 2). After setting the BAs, the processor 400 may select the different numbers of pixels having the same color from 2n (n=2 in FIG. 17A) row lines in each of the plurality of BAs.

Referring to FIG. 17A, the processor 400 may simultaneously select a row line r1 and a row line r3 in a first row access period and accumulate electric charges according to light received for the row exposure time. The processor 400 may share and read out electric charges of the same color pixels of the BAs in the row readout time. For example, the processor 400 may share and read out electric charges accumulated in odd column lines (for example, c1 and c3) and share and read out electric charges accumulated in even column lines (for example, c2 and c4). Secondly, in the row access period, the processor 400 may simultaneously select row lines r2 and r4 and accumulate electric charges according to light received for the row exposure time. Further, the processor 400 may read out signals of the column lines in the row readout time in the same way.

In pixel binning of the BAs 1700 of FIG. 17A, the row lines r1 and r3 may be selected in the first row access period and pixels B1, G2, B3, G4 and B9, G10, B11, G12 may accumulate electric charges for the row exposure time. In the column circuit of the pixel array that is not illustrated in the row readout time, electric charges of pixels B1, B3, B9, B11 may be shared and read out to the column line, and electric charges of pixels G2, G4, G10, G12 may be shared and read out to the column line. In the second row access period, row lines r2 and r4 may be selected and pixels G5, R6, G7, R8 and G13, R14, G15, R16 may accumulate electric charges for the row exposure time. In the column circuit of the pixel array which is not illustrated in the row readout time, electric charges of pixels G5, G7, G13, G15 may be shared and read out to the column line, and electric charges of pixels R6, R8, R14, R16 may be shared and read out to the column line.

FIG. 17B illustrates a method by which the image sensor in the normal mode and the image sensor in the binning mode access row lines in a 4*4 binning area.

When the image sensor bins the pixels of the 4*4 binning area, the image sensor may bin and read out corresponding four pixels B, and R in two row access periods. In the electronic device including a plurality of image sensors, when one or more image sensors execute the binning mode, row line synchronization between the image sensors that executes the binning mode and other image sensors may fail. For example, when 4*4 pixels are binned, while the image sensor in the normal mode accesses corresponding row lines in four row access periods, respectively, as indicated by a reference numeral 1710 of FIG. 17B, the image sensor in the binning mode may access four row lines in two row access periods as indicated by a reference numeral 1720. Reference numerals 1750 and 1760 are the row exposure time and reference numerals 1755 and 1765 are the row readout time. Although FIG. 17B illustrates an example in which the image sensor performs the binning operation of the row lines in the first and second row access periods, the image sensor may blank the first and second row access periods and perform the binning operation in the third and fourth row access periods.

FIG. 17C illustrates a method of synchronizing row accesses of the image sensor in the normal mode and the image sensor in the binning mode. In FIG. 17C, a reference numeral 1780 may indicate a row access operation of the first image sensor 420 that executes the normal mode and a reference numeral 1790 may indicate a row access operation of the second image sensor 430 that executes the binning mode. FIG. 17C illustrates an example where the second image sensor 430 bins 4*4 pixels. Further, row lines R1 to RN of the first image sensor 420 and row lines r1 to rN of the second image sensor 430 may be correlated row lines (corresponding row lines).

In a first row access period, when the first image sensor 420 accesses the low line R1, the second image sensor 430 may simultaneously access the row lines r1 and r3. In a second row access period, when the first image sensor 420 accesses the row line R2, the second image sensor 430 may simultaneously access the row lines r2 and r4. In a third row access period, when the first image sensor 420 accesses the row line R3, the second image sensor 430 may not perform the row access operation. In a fourth row access period, when the first image sensor 420 accesses the row line R4, the second image sensor 430 may not perform the row access operation. In the third and fourth row access periods, the second image sensor 430 may not perform the access operation by blanking the row exposure time and the row readout time.

As illustrated in FIG. 17C, the image sensor that executes the binning mode may access different row access periods according to the size of the binning area. For example, in the 4*4 binning area, the image sensor (for example, the second image sensor 430) that executes the binning mode may perform two row access operations in four row access periods. In the same way, the image sensor that executes the binning mode may perform two row access operations in six row access periods in a 6*6 binning area, and perform two row access operations in eight row access periods in a 8*8 binning area.

When one or more of the plurality of image sensors operate in the binning mode and process line images acquired by the image sensors, the electronic device may identity binning area sizes of the image sensors operating in the binning mode and synchronize the row access period of the binning mode with the row access period of the image sensor in the normal mode according to the identified binning area sizes.

Figure 18:
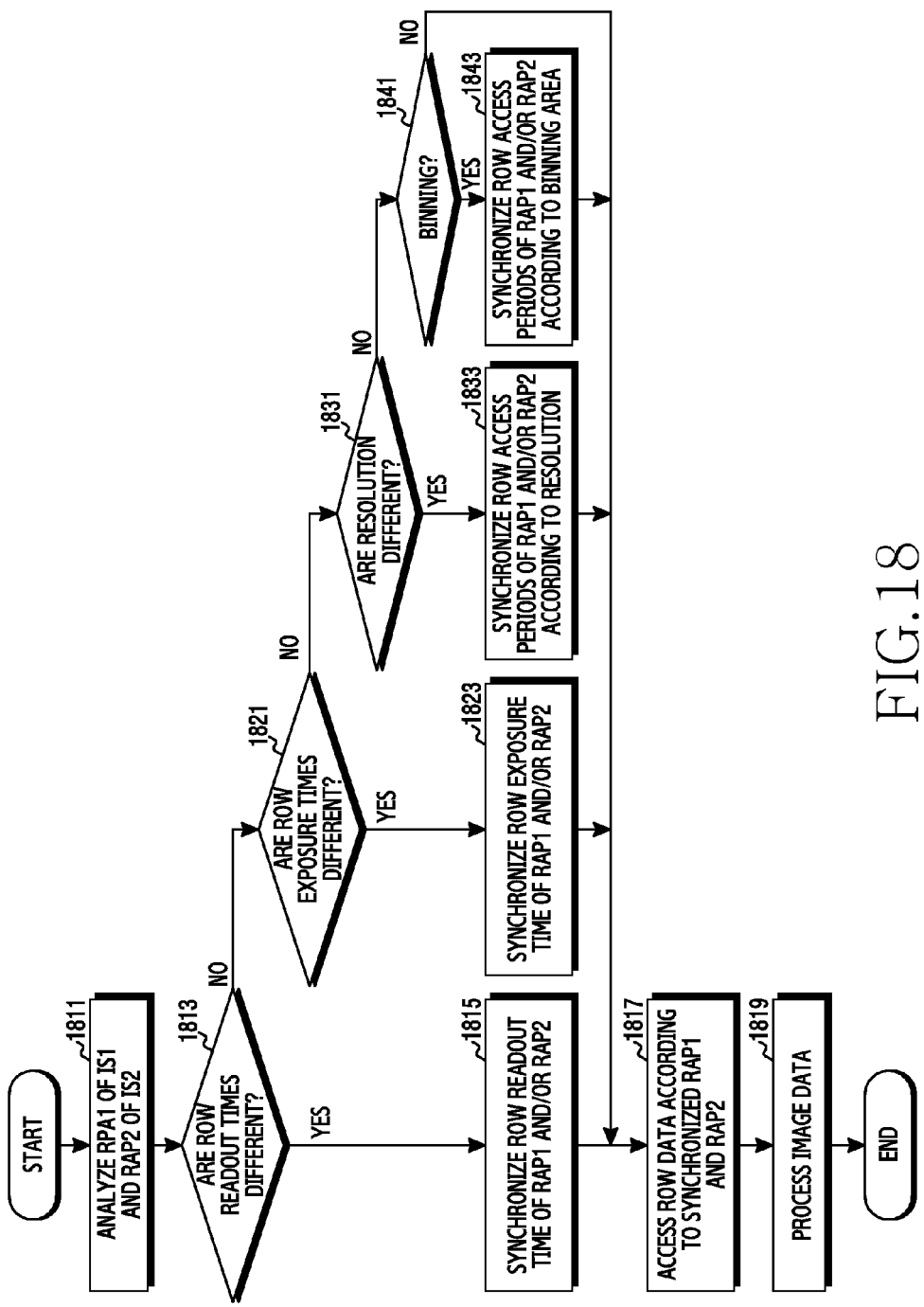
FIG. 18 is a flowchart illustrating a method by which an electronic device synchronizes row access periods by analyzing operation characteristics of image sensors, according to an embodiment of the present disclosure.

FIG. 18 is a flowchart illustrating a method by which the electronic device synchronizes row access periods by analyzing operation characteristics of image sensors, according to an embodiment of the present disclosure.

Referring to FIG. 18, the processor 400 analyzes row access periods of the image sensors, in operation 1811. The row access period of the image sensor may vary depending on operation characteristics of the image sensor. The image sensors may have the same resolution. The image sensors having the same resolution may have different row readout times according to the image sensor. The image sensors having the same resolution may have different line exposure times according to an exposure mode or characteristics of the image sensor. The image sensors having different resolutions may have different access times of corresponding row line images in spite of the same exposure time and the same readout time. Further, the image sensors in different operation modes may have different access times of corresponding row images.

The processor 400 determines whether row readout times are different, in operation 1813. When the row readout times are different, the processor 400 synchronizes the row readout times of the row access periods, in operation 1815. In a method of synchronizing the row readout times, the row readout times of the image sensors may be activated in set periods, and the image sensor having the shorter row readout time may synchronize the row readout time period by performing a horizontal blanking operation for a time during which the other image sensor activates the row readout time, as illustrated in FIGS. 9 to 10E. The processor 400 accesses row line data of the first image sensor 420 and the second image sensor 430 in the synchronized row access periods through the column line, in operation 1817, and processes line-synchronized line image data, in operation 1819.

When the row readout times are different, the processor 400 determines whether the row exposure times are different, in operation 1821. When the row exposure times are different, the processor 400 synchronizes the row exposure times of the row access periods, in operation 1823. In a method of synchronizing the row exposure times, the row exposure times of the image sensors may be activated in set periods, and the image sensor having the shorter row exposure time may synchronize the row exposure time period by performing a horizontal blanking operation for a time during which the other image sensor activates the row exposure time, as illustrated in FIGS. 11 to 12F. After synchronizing the row exposure times, the processor 400 proceeds to operation 1817.

When the row exposure times are the same, the processor 400 determines whether the resolutions are different, in operation 1831. When the resolutions are different, the processor 400 synchronizes the row access period to access the corresponding row line data, in operation 1833. In a method of synchronizing row access periods to access to allow the plurality of image sensors to access corresponding row lines, the processor 400 may identify the number of row lines by analyzing the resolutions of the image sensors and determine the row access period to access corresponding row line data of the image sensor having the higher resolution according to the identified number of row lines, as illustrated in FIGS. 14 to 15C. After synchronizing the row access period of the image sensor having the lower resolution to access the corresponding row line data, the processor 400 proceeds to operation 1817.

When the resolutions are the same, the processor 400 determines whether at least one of the plurality of image sensors operates in the binning mode, in operation 1841. When at least one of the plurality of image sensors operates in the binning mode, the processor 400 analyzes a binning area and synchronizes row access periods to allow the image sensor in the binning mode to access corresponding row line data of the image sensor in the normal mode, in operation 1843. In a method of synchronizing the row access periods to allow the image sensor in the binning mode to access the corresponding row lines of the image sensor in the normal mode, after identifying the binning area, the processor 400 may determine the row access periods that may be synchronized with row lines corresponding to the binned pixels, as illustrated in FIGS. 16 to 17C. After synchronizing the row access periods to access the corresponding row line data, the processor 400 proceeds to operation 1817.

When at least one of the plurality of image sensors does not operate in the binning mode, the processor proceeds to operation 1817.

Further, the first sensor image 420 and the second sensor image 430 may have different photographing modes of the camera. For example, the first image sensor 420 may be an image sensor that may acquire a full frame image, and the second image sensor 430 may be an image sensor that may acquire a cropped image. The cropped frame image acquired by the second image sensor 430 in the cropped mode may be a part of the full frame image acquired by the first image sensor 420. The processor 400 may know a row line location and a column line location of the full frame image where the cropped frame image can be located. When there is an image sensor for acquiring the cropped image among the image sensors, the processor 400 may access and store row line data while controlling the row access periods of the image sensors. When processing the stored image data of the image sensors, the processor 400 may extract images of the row lines and column line that match the cropped image from the full frame image and process the extracted images.

Further, a flash may be used while the images are acquired by driving the first image sensor 420 and the second image sensor 430. The first image sensor 420 and the second image sensor 430 may acquire the row line data with different exposure values according to an operation time and/or a location of the flash. For example, when the flash operates while the row line data is sequentially accessed by controlling the row access period, as illustrated in FIG. 5B, exposure values of the row line data may be changed in the frame image interval. The processor 400 may access and store the row line data while controlling the row access periods of the image sensors. Further, the processor 400 may process the row line data such that the row line data at a time point when the flash operates is distinguished from the previous row line data in the stored row line images.

An operation method of an electronic device according to various embodiments of the present disclosure may include an operation of identifying a first operation characteristic corresponding to the first image sensor and a second operation characteristic corresponding to the second image sensor; an operation of changing at least one value of a first access period of a first row of the first image sensor and a second access period of a second row of the second image sensor corresponding to the first row based on a difference between the first operation characteristic and the second operation characteristic to synchronize the first access period and the second access period; an operation of acquiring image data of an external object corresponding to the first row through the first image sensor based on the synchronized first access period; and an operation of acquiring image data of an external object corresponding to the second row through the second image sensor based on the synchronized second access period.

The first operation characteristic and the second operation characteristic may include a row readout time. The operation of synchronizing the first access period and the second access period may include an operation of synchronizing the first access period and the second access period by inserting a blanking interval into a row readout time period of the image sensor having a shorter row readout time between the first image sensor and the second image sensor based on a difference between the row readout times.

The operation characteristics may include a row exposure time. The operation of synchronizing the first access period and the second access period may include an operation of synchronizing the first access period and the second access period by inserting a blanking interval into a row exposure time period of the image sensor having a shorter row exposure time between the first image sensor and the second image sensor based on a difference between the row exposure times.

The first operation characteristic and the second operation characteristic may include an access period including a row exposure time and a row readout time.

The operation of synchronizing the first access period and the second access period may include an operation of synchronizing the first access period and the second access period by inserting a blanking interval into the access period of the image sensor having a shorter access period between the first image sensor and the second image sensor based on a difference between the access periods.

The first operation characteristic and the second operation characteristic may include a resolution. The operation of synchronizing the first access period and the second access period may include an operation of synchronizing the first access period and the second access period by performing blanking such that the access period of the image sensor having a lower resolution between the first image sensor and the second image sensor is synchronized with a corresponding row line of the image sensor having a higher resolution based on the difference between the resolutions.

When the first image sensor has a resolution of N row lines, the second image sensor has a resolution of M row lines, and N>M, the operation of synchronizing the first access period and the second access period may include an operation of synchronizing the access periods to make the row line data accessed by the second image sensor match the corresponding row line data of the first image sensor by performing blanking such that the access period of the second image sensor becomes N/M times of the access period.

The first operation characteristic and the second operation characteristic may include a normal mode and a binning mode. The operation of synchronizing the first access period and the second access period may include an operation of analyzing a binning area of the image sensor operating in the binning mode and synchronizing an access period of the image sensor operating in the binning mode of the second access period such that binning pixels match a corresponding row line of the image sensor operating in the normal line of the first access period. The binning area may correspond to $(2n)*(2m)$, where n and m are integers larger than or equal to 2, and the operation of synchronizing the first access period and the second access period may include an operation of synchronizing the access period of the image sensor operating in the binning mode such that two row accesses are made in 2n access periods of the image sensor operating in the normal mode.

Different blanking intervals may be applied to frames.

When the first operation characteristic and the second operation characteristic are different, the operation of synchronizing the first access period and the second access period may include an operation of analyzing access period information according to the difference between the first operation characteristic and the second operation characteristic in a memory and determining the first access period and the second access period.

When accessing row line images, an electronic device including a plurality of image sensors may synchronize row access periods according to operation characteristics of the image sensors. The operation characteristic of the image sensor may be a row readout time difference of the row access period, a row exposure time difference, a resolution difference of the image sensors, and operation modes of the image sensors.

When row readout times of the image sensors are different, the electronic device may synchronize the readout times on each row line by controlling a readout time of each row line data for each image sensor.

Further, as necessary, a blanking interval inserted into the first image sensor and the second image sensor may be differently applied between frames. For example, first frame access may be performed using a first blanking interval and second frame access may be performed using a second blanking interval which is different from the first blanking interval.

When an exposure change is generated due to auto exposure control, the electronic device may analyze exposure or gain information of the image sensors and synchronize exposure times on each row line of image sensors based on information on the plurality of sensors already stored in the memory or given as an input (for example, a clock speed, line_length_pck, frame_length_line . . . ).

When a plurality of image sensors having different resolutions are provided, the electronic device may synchronize the row access periods of the image sensors at the time when corresponding row lines (row lines corresponding to the same image area in the image) can be accessed.

When there is an image sensor operating in a binning mode among image sensors, the electronic device may synchronize the row access periods of the image sensors at the time when corresponding row lines (row lines corresponding to the same image area in the image) can be accessed according to the binning area.

When there is an image sensor in a crop mode or when a flash works while image sensors are operating, row line data can be processed by analyzing row line images of the image sensors accessed in the method described above.

While the present disclosure has been shown and described with reference to certain embodiments thereof, it will be understood by those skilled in the art that various changes in form and detail may be made therein without departing from the spirit and scope of the disclosure as defined by the appended claims.

What is claimed is:

1. An electronic device comprising:
   a first image sensor:
   a second image sensor: and
   a processor functionally connected to the first image sensor and the second image sensor, the processor being configured to:
   identify a first operation characteristic of the first image sensor and a second operation characteristic of the second image sensor,
   change at least one of a first access period of a first row of the first image sensor and a second access period of a second row of the second image sensor, based on a difference between the first operation characteristic and the second operation characteristic, to synchronize the first access period and the second access period, wherein the second row corresponds to the first row,
   acquire image data corresponding to the first row through the first image sensor based on the synchronized first access period, and
   acquire image data corresponding to the second row through the second image sensor based on the synchronized second access period.

2. The electronic device of claim 1, wherein the first operation characteristic and the second operation characteristic include a row readout time, and the processor synchronizes the first access period and the second access period by inserting a blanking interval into a row readout time period of one of the first image sensor and the second image sensor based on a difference between the row readout times, the one of the first image sensor and the second image sensor having a shorter row readout time among row readout times of the first image sensor and the second image sensor.

3. The electronic device of claim 1, wherein the first operation characteristic and the second operation characteristic include a row exposure time, and the processor synchronizes the first access period and the second access period by inserting a blanking interval into a row exposure time period of one of the first image sensor and the second image sensor based on a difference between the row exposure times, the one of the first image sensor and the second image sensor having a shorter row exposure time among row exposure times of the first image sensor and the second image sensor.

4. The electronic device of claim 1, wherein the first operation characteristic and the second operation characteristic include an access period including a row exposure time and a row readout time, and the processor synchronizes the first access period and the second access period by inserting a blanking interval into the access period of one of the first image sensor and the second image sensor based on a difference between the access periods, the one of the first image sensor and the second image sensor having a shorter access period among access periods of the first image sensor and the second image sensor.

5. The electronic device of claim 1, wherein the first operation characteristic and the second operation characteristic include a resolution, and the processor synchronizes the first access period and the second access period by performing blanking such that the access period of one of the the first image sensor and the second image sensor is synchronized with a corresponding row line of another of the first image sensor and the second image sensor, based on a difference between the resolutions, the one of the first image sensor and the second image sensor having a lower resolution among resolutions of the first image sensor and the second image sensor.

6. The electronic device of claim 5, wherein, when the first image sensor has a resolution of N row lines, the second image sensor has a resolution of M row lines, and N>M, the processor synchronizes the first access period and the second access period by performing blanking such that the access period of the second image sensor becomes N/M times of the access period.

7. The electronic device of claim 1, wherein the first operation characteristic and the second operation characteristic include a normal mode and a binning mode, and the processor is further configured to analyze a binning area of one of the first image sensor and the second image sensor that is operating in the binning mode, and synchronize an access period of the one of the first image sensor and the second image sensor such that binning pixels match a corresponding row line of another of the first image sensor and the second image sensor operating in the normal mode.

8. The electronic device of claim 7, wherein the binning area corresponds to (2n)*(2m), where n and m are integers greater than or equal to 2, and the processor synchronizes the access period of the one of the first image sensor and the second image sensor operating in the binning mode such that two accesses are made in 2n access periods of the other of the first image sensor and the second image sensor operating in the normal mode.

9. The electronic device of claim 8, wherein the one of the first image sensor and the second image sensor operating in the binning mode further includes a column circuit, and the column circuit combines and reads out equal color pixel signals read out to a column line of the binning area.

10. The electronic device of claim 1, further comprising a memory configured to store access period information according to the first operation characteristic and the second operation characteristic,
wherein the processor is further configured to analyze the access period information according to the first operation characteristic and the second operation characteristic in the memory, and determine the first access period and the second access period.

11. A method of synchronizing data by an electronic device, the method comprising:
identifying a first operation characteristic of a first image sensor of the electronic device and a second operation characteristic of a second image sensor of the electronic device;
changing at least one of a first access period of a first row of the first image sensor and a second access period of a second row of the second image sensor, based on a difference between the first operation characteristic and the second operation characteristic, to synchronize the first access period and the second access period, wherein the second row corresponds to the first row;
acquiring image data corresponding to the first row through the first image sensor based on the synchronized first access period; and
acquiring image data corresponding to the second row through the second image sensor based on the synchronized second access period.

12. The method of claim 11, wherein the first operation characteristic and the second operation characteristic include a row readout time, and synchronizing the first access period and the second access period comprises synchronizing the first access period and the second access period by inserting a blanking interval into a row readout time period of one of the first image sensor and the second image sensor based on a difference between the row readout times, the one of the first image sensor and the second image sensor having a shorter row readout time among row readout times of the first image sensor and the second image sensor.

13. The method of claim 11, wherein the first operation characteristic and the second operation characteristic include a row exposure time, and synchronizing the first access period and the second access period comprises synchronizing the first access period and the second access period by inserting a blanking interval into a row exposure time period of one of the first image sensor and the second image sensor based on a difference between the row exposure times, the one of the first image sensor and the second image sensor having a shorter row exposure time among row exposure times of the first image sensor and the second image sensor.

14. The method of claim 11, wherein the first operation characteristic and the second operation characteristic include an access period including a row exposure time and a row readout time, and synchronizing the first access period and the second access period comprises synchronizing the first access period and the second access period by inserting a blanking interval into the access period of one of the first image sensor and the second image sensor based on a difference between the access periods, the one of the first image sensor and the second image sensor having a shorter access period among access periods of the first image sensor and the second image sensor.

15. The method of claim 14, wherein different blanking intervals are applied to frames.

16. The method of claim 11, wherein the first operation characteristic and the second operation characteristic include a resolution, and synchronizing the first access period and the second access period comprises synchronizing the first access period and the second access period by performing blanking such that the access period of one of the the first image sensor and the second image sensor is synchronized with a corresponding row line of another of the first image sensor and the second image sensor, based on a difference between the resolutions, the one of the first image sensor and the second image sensor having a lower resolution among resolutions of the first image sensor and the second image sensor.

17. The method of claim 16, wherein, when the first image sensor has a resolution of N row lines, the second image sensor has a resolution of M row lines, and N>M, synchronizing the first access period and the second access period comprises synchronizing the first access period and the second access period to make row line data accessed by the second image sensor match row line data of the first image sensor by performing blanking such that the access period of the second image sensor becomes N/M times of the access period.

18. The method of claim 11, wherein the first operation characteristic and the second operation characteristic include a normal mode and a binning mode, and synchronizing the first access period and the second access period comprises analyzing a binning area of one of the first image sensor and the second image sensor that is operating in the binning mode, and synchronizing an access period of the one of the first image sensor and the second image sensor such that binning pixels match a corresponding row line of another of the first image sensor and the second image sensor operating in the normal line.

19. The method of claim 18, wherein the binning area corresponds to (2n)*(2m), where n and m are integers greater than or equal to 2, and synchronizing the first access period and the second access period comprises synchronizing the access period of the one of the first image sensor and the second image sensor operating in the binning mode such that two accesses are made in 2n access periods of the other of the first image sensor and the second image sensor operating in the normal mode.

20. The method of claim 11, wherein synchronizing the first access period and the second access period further comprises, when the first operation characteristic and the second operation characteristic are different, analyzing access period information according to the difference between the first operation characteristic and the second operation characteristic in a memory, and determining the first access period and the second access period.

* * * * *